(12) United States Patent
DeStefano

(10) Patent No.: US 6,275,227 B1
(45) Date of Patent: Aug. 14, 2001

(54) COMPUTER SYSTEM AND METHOD FOR CONTROLLING THE SAME UTILIZING A USER INTERFACE CONTROL INTEGRATED WITH MULTIPLE SETS OF INSTRUCTIONAL MATERIAL THEREFOR

(75) Inventor: George Francis DeStefano, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/020,680

(22) Filed: Feb. 9, 1998

(51) Int. Cl.[7] .................................................. G06F 3/00
(52) U.S. Cl. ..................... 345/339; 345/345; 345/336; 345/968
(58) Field of Search .................................. 345/339, 340, 345/344, 345, 348, 968

(56) References Cited

U.S. PATENT DOCUMENTS

| | | | |
|---|---|---|---|
| 4,663,616 | 5/1987 | Himelstein | 340/724 |
| 4,752,889 | 6/1988 | Rappaport et al. | 364/513 |
| 4,860,218 | 8/1989 | Sleator | 364/518 |
| 4,868,765 | 9/1989 | Diefendorff | 364/521 |
| 4,964,077 | 10/1990 | Eisen et al. | 364/900 |
| 5,122,972 | 6/1992 | Richards et al. | 395/157 |
| 5,186,629 | 2/1993 | Rohen | 434/114 |

(List continued on next page.)

OTHER PUBLICATIONS

Michelle Shaw, *Microsoft® Office 6–in–1*, Que Corporation, (1994), pp. 10–11, 14–15, 40 and 42–43.
*Screen Shot of Microsoft Works Application*, (no date).
*Screen Shots of Lotus Notes Software Application*, (no date).
"Visualizing the Information Space of Hypermedia Systems", *Graphics Visualization & Usability Center*, (no date).

Elder et al., "Architecture for Platform and Presentation Independent User Interface for Applications", *IBM® Technical Disclosure Bulletin*, vol. 38, No. 1, pp. 297–302, (1/95).

Brittan, David, "MIT Reporter", *Technology Review*, pp. 12–14, (2/97).

Furnas, George W., "Generalized Fisheye Views", *Bell Communications Research*, CHI '86 Proceedings (Apr. 1986), pp. 16–22.

*Primary Examiner*—John Breene
*Assistant Examiner*—Sy D. Luv
(74) *Attorney, Agent, or Firm*—Wood, Herron & Evans; Scott A. Stinebruner

(57) ABSTRACT

A computer system and method of controlling a computer system integrate the display of a user interface control from which a user supplies input to a computer system with the display of multiple representations of instructional material related to how to operate the control. Displayed representations of first and second sets of instructional material may be concurrently or selectively integrated with a displayed representation of the user interface control. When multiple sets of instructional material are concurrently displayed, the user interface control may be actuated in response to user input supplied to multiple displayed representations of the user interface control. Moreover, when multiple sets of instructional material are selectively displayed, different sets of such material may replace other sets in response to user input. By integrating the display of a user interface control with the display of associated instructional material, a user is better able to comprehend and utilize the functionality of the user interface control without losing focus on the task at hand. Moreover, by concurrently or selectively displaying multiple sets of instructional material with a particular user interface control, a wider variety of potential users of the control may be supported.

43 Claims, 12 Drawing Sheets

U.S. PATENT DOCUMENTS

| | | | |
|---|---|---|---|
| 5,255,356 | 10/1993 | Michelman et al. | 395/148 |
| 5,295,243 | 3/1994 | Robertson et al. | 395/160 |
| 5,297,249 | 3/1994 | Bernstein et al. | 395/156 |
| 5,301,301 | 4/1994 | Kodosky et al. | 395/500 |
| 5,333,254 | 7/1994 | Robertson | 395/155 |
| 5,335,320 | 8/1994 | Iwata et al. | 717/4 |
| 5,339,390 | 8/1994 | Robertson et al. | 395/157 |
| 5,361,361 | 11/1994 | Hickman et al. | 395/700 |
| 5,363,482 | 11/1994 | Victor et al. | 345/346 |
| 5,416,903 | 5/1995 | Malcolm | 395/155 |
| 5,438,662 | 8/1995 | Randall | 395/161 |
| 5,461,399 | 10/1995 | Cragun | 345/145 |
| 5,483,632 | 1/1996 | Kuwamoto et al. | 395/156 |
| 5,506,937 | 4/1996 | Ford et al. | 395/12 |
| 5,528,744 | 6/1996 | Vaughton | 395/157 |
| 5,546,529 | 8/1996 | Bowers et al. | 395/159 |
| 5,588,104 | 12/1996 | Lanier et al. | 395/326 |
| 5,610,828 | 3/1997 | Kodosky et al. | 716/11 |
| 5,613,134 | 3/1997 | Lucus et al. | 395/788 |
| 5,615,326 | 3/1997 | Orton et al. | 395/356 |
| 5,617,114 | 4/1997 | Bier et al. | 345/113 |
| 5,621,874 | 4/1997 | Lucas et al. | 395/761 |
| 5,638,523 | 6/1997 | Mullet et al. | 345/326 |
| 5,644,740 | 7/1997 | Kiuchi | 395/357 |
| 5,657,992 | 8/1997 | Bellizzi | 273/273 |
| 5,670,984 | 9/1997 | Robertson et al. | 345/139 |
| 5,671,381 | 9/1997 | Strasnick et al. | 395/355 |
| 5,689,642 | 11/1997 | Harkins et al. | 395/200.04 |
| 5,694,561 | 12/1997 | Malamud et al. | 395/346 |
| 5,729,704 | 3/1998 | Stone et al. | 345/346 |
| 5,751,283 | 5/1998 | Smith | 345/342 |
| 5,754,176 | 5/1998 | Crawford | 345/338 |
| 5,760,772 | 6/1998 | Austin | 345/342 |
| 5,771,042 | 6/1998 | Santos-Gomez | 345/342 |
| 5,786,820 | 7/1998 | Rboertson | 345/357 |
| 5,796,402 | 8/1998 | Ellison-Taylor | 345/342 |
| 5,802,514 | 9/1998 | Huber | 707/4 |
| 5,808,610 | 9/1998 | Benson et al. | 345/342 |
| 5,812,804 | 9/1998 | Bates et al. | 395/342 |
| 5,815,151 | 9/1998 | Agriolas | 345/342 |
| 5,819,055 | 10/1998 | MacLean et al. | 395/342 |
| 5,835,088 | 11/1998 | Jaaskelainen, Jr. | 345/343 |
| 5,856,826 | 1/1999 | Craycoft | 345/346 |
| 5,874,962 | 2/1999 | de Judicibus et al. | 345/342 |
| 5,874,964 | 2/1999 | Gille | 345/356 |
| 5,877,775 | 3/1999 | Theisen et al. | 345/440 |
| 5,880,733 | 3/1999 | Horvitz et al. | 345/355 |
| 5,894,311 | 4/1999 | Jackson | 345/440 |
| 5,900,876 | 5/1999 | Yagita et al. | 345/350 |
| 5,909,690 | 6/1999 | Tanigawa et al. | 707/526 |
| 5,912,668 | 6/1999 | Sciammarella et al. | 345/348 |
| 5,920,314 | 7/1999 | Maesano et al. | 345/340 |
| 5,937,400 | 8/1999 | Au | 706/55 |
| 5,973,697 | 10/1999 | Berry et al. | 345/418 |
| 5,973,702 | 10/1999 | Orton et al. | 345/433 |
| 6,002,401 | 12/1999 | Baker | 345/349 |
| 6,012,072 | 1/2000 | Lucas et al. | 707/526 |
| 6,031,989 | 2/2000 | Cordell | 395/701 |
| 6,088,032 | 7/2000 | Mackinlay | 345/355 |
| 6,097,375 | 8/2000 | Byford | 345/169 |

COMPUTER SYSTEM AND METHOD FOR CONTROLLING THE SAME UTILIZING A USER INTERFACE CONTROL INTEGRATED WITH MULTIPLE SETS OF INSTRUCTIONAL MATERIAL THEREFOR

CROSS-REFERENCE TO RELATED APPLICATIONS

This application is related to the following co-pending applications which were filed on even date herewith by George Francis DeStefano: U.S. Ser. No. 09/020,679 entitled "COMPUTER SYSTEM AND METHOD FOR AUTHORING, ABSTRACTING AND ACCESSING A BODY OF KNOWLEDGE" (RO997-003); U.S. Ser. No. 09/220,534 entitled "COMPUTER SYSTEM, METHOD AND USER INTERFACE COMPONENTS FOR ABSTRACTING AND ACCESSING A BODY OF KNOWLEDGE" (RO997-004); and U.S. Ser. No. 09/759,574 entitled "COMPUTER SYSTEM AND METHOD FOR ABSTRACTING AND ACCESSING A CHRONOLOGICALLY-ARRANGED COLLECTION OF INFORMATION" (RO997-092). This application is also related to the following co-pending applications which were filed on Dec. 15, 1997 by George Francis DeStefano: U.S. Ser. No. 08/990,370 entitled "COMPUTER SYSTEM AND METHOD OF MANIPULATING A WINDOW ON A COMPUTER DISPLAY THROUGH COLLISION WITH A POINTER" (RO997-005); U.S. Ser. No. 08/990,370 entitled "COMPUTER SYSTEM AND METHOD OF MANIPULATING MULTIPLE GRAPHICAL USER INTERFACE COMPONENTS ON A COMPUTER DISPLAY WITH A PROXIMITY POINTER" (RO997-041). Each of these applications is hereby incorporated by reference herein.

FIELD OF THE INVENTION

The invention is generally related to computer systems and graphical user interface environments therefor. More particularly, the invention is related to display and user access to information in a computer system or the like.

BACKGROUND OF THE INVENTION

The human communication process has evolved over thousands of years to principally include both spoken and written communication. In addition, over time much of the combined knowledge base of the world has been recorded in written form (e.g., in books), so that others are able to more conveniently access and use such information.

With the advent of computer technology, more and more information is stored in an electronic form and accessed via a computer, rather than via the written page. Nonetheless, throughout the evolution of human communication, information has always be regarded as being essentially one-dimensional—that is, a series of ideas strung together in a sequence of words or pages. Book pages and computer displays are each two-dimensional in nature, and may even provide two dimensional representations of three-dimensional objects. However, the basic structure of a collection of information presented in either case is still for the most part one-dimensional insofar as a person processes the information in a generally linear fashion.

A one-dimensional representation of information may be adequate for some when the amount of information is not that great. However, a person may have difficulty fully comprehending a collection of information about a particular topic when the information is located in several sources and/or when the information is associated with several levels of abstraction.

A level of abstraction typically relates to a particular manner of looking at a given collection of information, also referred to as a body of knowledge. Among other criteria, different levels of abstraction may relate to different comprehension levels, e.g., a basic or summary level vs. an advanced level, or different points of view or ways of looking at or stratifying the information.

When accessing information in a body of knowledge (e.g., for performing a particular task relating to such information), a person may be required to manage and understand a number of levels of abstraction at the same time. However, since books and computers typically require a person to access information from one source, and/or from one level of abstraction, at a time, the person may be forced to plod through information in a linear fashion and without the ability to visualize the relationship of the information in the broader scope of the body of knowledge.

Furthermore, in the instances where a person is able to access information from more than one source or level of abstraction, the information is often provided in disjointed views, offering no opportunity for a person to visualize the interaction of information from different levels and/or sources. Many computer systems, for example, use graphical user interfaces (GUIs) through which users are able to interact with various computer programs through intuitive operations such as "pointing and clicking" on graphical display elements—typically various user interface controls such as buttons, edit boxes, check boxes, etc. Information is often presented to a user in a GUI environment using a graphical user interface component known as a window. Each computer program executing in a GUI environment is typically allocated one or more windows to present information to and/or receive input from a user. User interface controls are often grouped together in windows with only the most basic informational labels provided for each control. Moreover, a number of computer systems provide the ability to multitask—that is, to execute more than one computer program at the same time—such that windows from multiple programs may be displayed on a computer display simultaneously.

While information from more than one source or level of abstraction for a body of knowledge may be displayed simultaneously in different windows on a computer system, the relationship between the information displayed in the different windows, as well as the relationship of the information within the broader scope of the body of knowledge, is often not readily discernable by a user. As a result, it can become difficult for a user to manage the information in a coherent manner. Switching between different formats and views can become disorienting and distracting, often significantly impeding the learning process.

One specific difficulty that arises as a result of this information overload is that many users have difficulty comprehending how to perform specific tasks with many computer programs. Many users find computers to be quite counterintuitive despite the best efforts of computer programmers to simplify and standardize the user interfaces of computer programs. A great deal of effort has been expended, for example, in developing online help systems that attempt to answer questions and otherwise provide instructional information to assist a user in performing tasks with a particular program.

Many help systems are provided as separate computer programs that are not particularly well integrated with the computer programs to which they are directed. As a result, instructional materials about a particular computer program, or specifically about particular user interface controls that a user can actuate to perform various tasks with the program, are often provided in separate windows from that of the program, which can distract a user due to the constant need to switch his or her focus back and forth between the computer program and the help system. Furthermore, many help systems are poorly organized and may require a user to expend significant effort in locating a particular set of materials that relate to a given task or topic.

Some help systems provide greater integration with their respective computer programs to reduce the amount of effort a user must expend to access instructional materials about a particular task or topic. For example, some computer programs utilize "bubble" help systems, where a pop-up window is displayed providing more detailed instructions about a particular user interface control whenever a user directs a pointer over the control. In other help systems, specific buttons may be integrated within instructional materials about a particular topic to permit a user to open a window or dialog box suitable to perform a given task related to that topic.

Nonetheless, most computer programs, and in particular most of the user interface controls that are utilized by such programs to perform specific tasks, continue to be by and large presented to a user in a separate and distinct manner from the instructional materials (if any) that a user might require to understand precisely how to use such controls. Consequently, users often waste a significant amount of time attempting to locate and comprehend instructional materials for performing specific tasks in a computer system.

Another difficulty that arises with many computer programs is that different users of a given computer program may have differing levels of training, expertise and/or familiarity with the program, and thus may require different degrees of assistance from a help system over time. Specific users also typically become more adapt at using a program over time, and thus may have differing needs as their understanding of how to use a program grows. Moreover, different features of a computer program may need to be utilized from time to time based upon the particular tasks that a user is attempting to perform. As a result, it becomes extremely difficult, if not impossible, for many help systems to include instructional materials that are both simple enough to be used by a casual user as well as detailed enough to handle more complex questions presented by expert users.

Consequently, a significant need continues to exist for an improved manner of integrating together the presentation of user interface controls and associated instructional material to facilitate understanding and comprehension by a wide variety of users.

SUMMARY OF THE INVENTION

The invention addresses these and other problems associated with the prior art by providing a computer system and method of controlling a computer system in which the display of a user interface control from which a user supplies input to a computer system is integrated with the display of multiple representations of instructional material related to how to operate the control.

Consistent with one aspect of the invention, for example, first and second display groups may be displayed on a computer display, with the first display group including a first displayed representation of the user interface control integrated with a displayed representation of a first set of user instructional material for operating the user interface control, and with the second display group including a second displayed representation of the user interface control integrated with a displayed representation of a second set of user instructional material for operating the user interface control. The user interface control may be actuated in response to user input supplied to either of the first and second displayed representations of the user interface control.

Consistent with another aspect of the invention, a displayed representation of the user interface control may be integrated with a displayed representation of a first set of user instructional material for operating the user interface control. Then, in response to user input, the displayed representation of the first set of user instructional material may be selectively replaced with a displayed representation of a second set of user instructional material for operating the user interface control.

By integrating the display of a user interface control with the display of associated instructional material, a user is better able to comprehend and utilize the functionality of the user interface control without losing focus on the task at hand. Moreover, by concurrently or selectively displaying multiple sets of instructional material with a particular user interface control, a wider variety of potential users of the control may be supported in a significantly more flexible and intuitive manner.

These and other advantages and features, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described embodiments of the invention.

DETAILED DESCRIPTION

Hardware Environment

Figure 1:
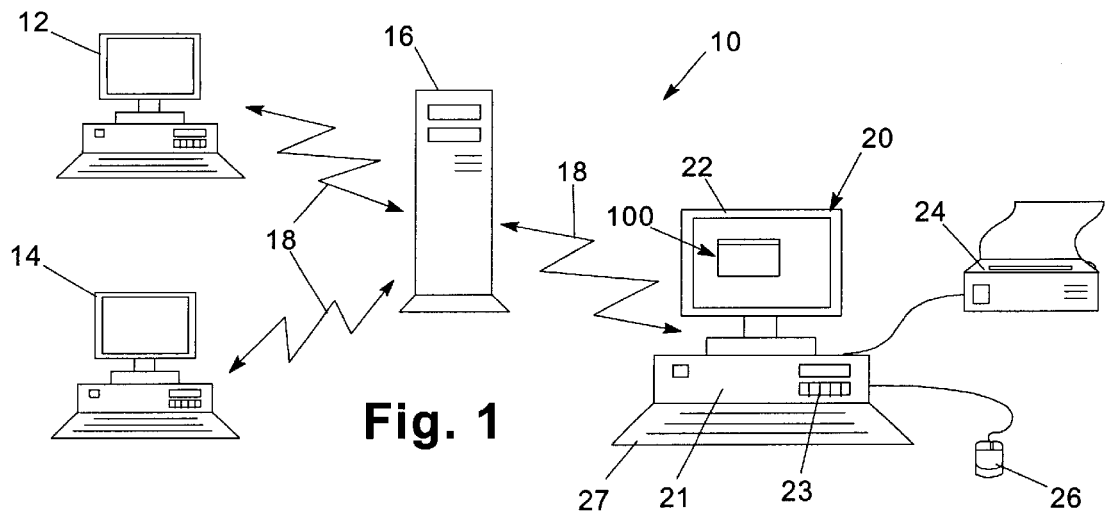
FIG. 1 is a block diagram of a computer system consistent with the invention.

Turning to the Drawing, wherein like numbers denote like parts throughout the several views, a computer system 10 consistent with the invention is illustrated in FIG. 1. Computer system 10 is illustrated as a networked computer system including one or more client computer systems 12, 14 and 20 (e.g., desktop or personal computers, workstations, etc.) coupled to server system 16 through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers. Furthermore, it should be appreciated that the principles of the invention may be utilized as well by stand-alone computers and associated devices consistent with the invention.

Computer system 20, which may be similar to computer systems 12, 14, may include a processor such as a microprocessor 21; a number of peripheral components such as a computer display 22; storage devices 23 such as hard, floppy, and/or CD-ROM disk drives; a printer 24; and various input devices (e.g., a mouse 26 and keyboard 27), among others. Computer system 20 operates under the control of an operating system, and executes various computer software applications, programs, objects, modules, etc. Moreover, various applications, programs, objects, modules, etc. may also execute on one or more processors in server 16 or other computer systems 12, 14, e.g., in a distributed computing environment.

Computer display 22 may include any known manner of visually presenting information to a user. For example, computer display 22 may be a video monitor, e.g., a cathode-ray tube (CRT), a liquid crystal display (LCD), or a projection display, among others. In addition, other types of computer displays, including two dimensional displays that simulate three dimensions (e.g., virtual reality headsets), as well as three dimensional displays such as holographic tanks and the like, may also be used.

User input may also be received from other known user input devices. For example, control of a pointer on a display may be handled by a trackball, a joystick, a light pen, a touch sensitive pad or display, a digitizing tablet, and a keyboard, among others. In addition, many of such devices include one or more user controls such as buttons, thumb wheels, sliders and the like. Moreover, voice and/or image recognition may be used to permit a user to provide voice commands and/or gestures to provide user input to a computer system. Other user interface devices may also be used in the alternative.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in networked computer system 10, cause those devices or systems to perform the steps necessary to execute steps or elements embodying the various aspects of the invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, DVD's, and transmission type media such as digital and analog communications links.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Figure 2:
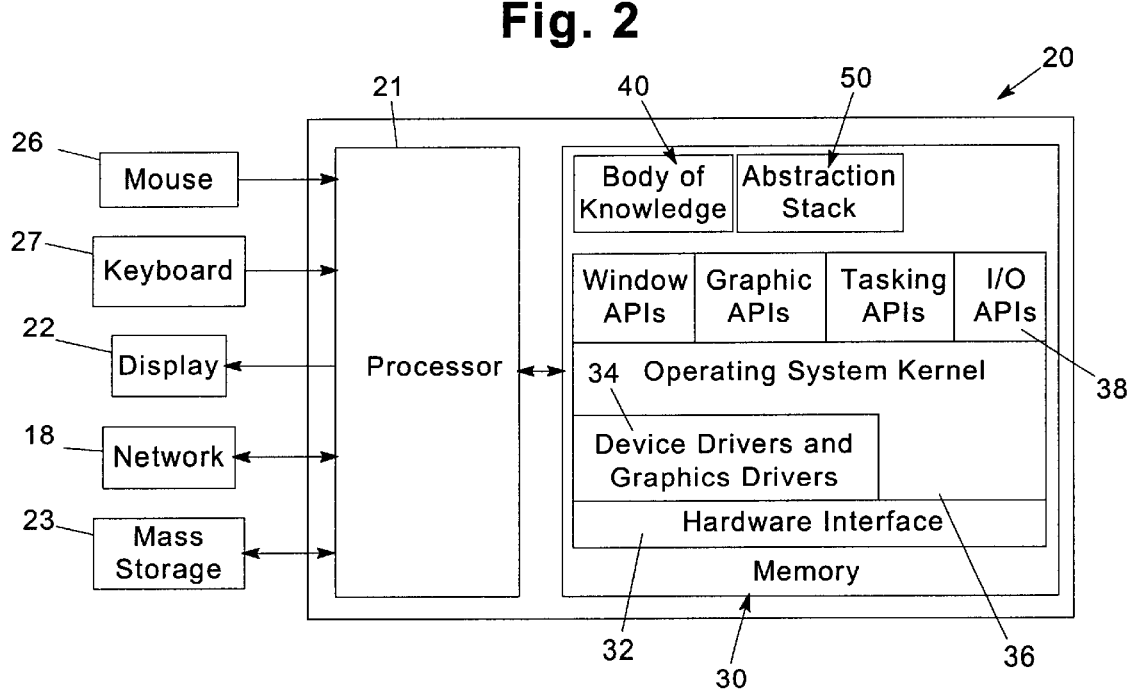
FIG. 2 is a block diagram of an exemplary software environment for the computer system of FIG. 1.

FIG. 2 illustrates one suitable software environment for computer system 20 consistent with the invention. A processor 21 is illustrated as coupled to a memory 30 as well as to several inputs and outputs. For example, user input is received by processor 21, e.g., by mouse 26 and keyboard 27, among others. Additional information may be passed between computer system 20 and other computer systems in networked computer system 10 via network 18. Additional information may be stored to and/or received from mass storage 23. Processor 21 also outputs display data to display 22. It should be appreciated that computer system 20 includes suitable interfaces between processor 21 and each of components 18, 22, 23, 26, 27 and 28 as is well known in the art.

A number of system computer programs are stored in memory 30, including hardware interface program code 32, device and graphics drivers 34, operating system kernel 36, and various application programming interfaces (APIs) 38, e.g., Window APIs, Graphic APIs, Tasking APIs and Input/Output APIs, among others. It should be appreciated that the configuration and operation of each of these system programs typically depends upon the particular computer hardware used, and is in general well understood in the art. For example, any of a number of operating systems may be used, e.g., OS/400 for the AS/400 midrange computer, Windows 95 or Windows NT for a PC system, MacOS for the Macintosh computer, or any of the number of variations of UNIX, among others.

Any number of computer software applications may execute on computer system 10 by utilizing the system program code provided therein. Moreover, memory may also store data utilized by various applications or system program code. For example, FIG. 2 illustrates a body of knowledge 40 and an abstraction stack 50, each of which are discussed in greater detail below.

It should be appreciated that the system program code represented at 32–38, body of knowledge 40, and abstraction stack 50 may be stored on network 18 or mass storage 23 prior to start-up. In addition, each may have various components that are resident at different times in any of memory 30, mass storage 23, network 18, or within registers and/or caches in processor 21 (e.g., during execution thereof).

It should also be appreciated that other software environments may be utilized in the alternative.

Integrated Display of User Interface Control with User Instructional Material

As discussed above, various embodiments of the invention integrate the display of a user interface control with the display of user instructional material for operating such control. The embodiments described hereinafter are explained in terms of a standard object-oriented, event-driven graphical user interface (GUI) environment such as provided by the Windows operating system from Microsoft and the Macintosh operating system from Apple, among others. However, it should be appreciated that other interface environments may be used consistent with the invention, and thus, the invention should not be limited to the particular implementations described herein.

A user interface control generally includes any computer program that includes a displayed representation through which a user supplies input to the control. In many GUI and object oriented systems, for example, various generic user interface controls are defined in the operating system, which can be instantiated and grouped together by a computer software application to provide a standardized interface for the application. Examples of generic user interface controls provided in many GUI environments include pop-up buttons, push buttons, radio buttons, check boxes, color wheels, combo boxes, counters, date controls, edit boxes, filename boxes, list boxes, scroll bars, viewers, crossover-sensitive objects, keyboard bindings, voice bindings, etc. However, it should be appreciated that other generic and/or customized user interface controls, whether or not implemented in a GUI environment, may also be used in the alternative.

A user interface control may be responsive to any number of the user input devices discussed above. Thus, while many of the user interface controls herein are typically responsive to mouse and/or keyboard input from a user, it should be appreciated that the invention should not be limited solely to such forms of input.

Typically, a user interface control includes executable program code that handles user interface with the control. For example, in many GUI environments, a user interface control typically includes an event manager that handles predetermined events generated by an operating system in response to user input (e.g., clicking on a control, typing data into a control, etc.).

A user interface control is also typically associated with additional program code, internal or external to the control, that performs a predetermined task in a computer system. For example, a user interface control may be utilized to provide an input parameter to a particular computer program. In addition, a user interface control (e.g., a button) may also initiate the execution of a particular computer program, typically through a command or function call thereto. Moreover, multiple user interface controls may be grouped together to handle a predetermined function, e.g., to supply a plurality of input parameters to a function as well as initiate the execution of the function using the current values of those parameters.

A user interface control is typically presented to a user via a displayed representation on a computer display. In many GUI environments, for example, a standardized displayed representation is provided for a number of generic controls. Consistent with the invention, multiple displayed representations may be utilized for a given user interface control. It should be appreciated that the multiple displayed representations maybe implemented in a number of manners, e.g., with multiple displayed representations linked to the same underlying control object, or linked to separate objects that operate in a coordinated fashion with one another. It should be appreciated, however, that the use of either alternative is simply a matter of implementation, and thus the invention should not be limited to any particular implementation.

For example, one suitable manner for implementing multiple representations of a user interface control in a standard GUI environment is to utilize multiple instances of a common object so that the operating system treats each instance as a separate user interface control for display purposes, but with the instances operating in a coordinated fashion so that functionally the instances form a single control. Often, this configuration would require that each instance update the other instances in response to user input received thereby, e.g., by passing a message or event to other known instances of the control requesting an update to their respective displayed representations to incorporate the user input. Implementing such a configuration is well within the abilities of one skilled in the art, and thus will not be discussed in greater detail herein.

User instructional material may include practically any format of information that may be used to instruct a user about a particular user interface control, e.g., text data, as well as multimedia data such as image data, audio data, video data, animated data, etc., and combinations thereof. User instructional material typically includes information that a user may access to better understand generally how a particular user interface control operates, how a particular computer program that utilizes that user interface control operates, or how the control relates to the overall function of the program, among others.

As one example, for a combo box that is used to select an interface range from a list of interface ranges for a user profile establishing function, user instructional material may be provided that explains how a user is able to type information directly into the control or select among predetermined list selections via the drop-down menu provided by the control. Moreover, other user instructional material may be provided that explains the input format for an interface range that is expected by the user profile establishing function. Still more instructional material may be provided that explains the significance of an interface range and describes the typical reasons for assigning different ranges to different users and the ways in which a user's interaction with the system is affected by different interface ranges.

As discussed above, preferred embodiments of the invention typically utilize more than one set of user instructional material relating to a given user interface control. These multiple sets may be distinguished in any number of manners that enable alternate material to be selectively or concurrently presented to a user. For example, sets of instructional material may be distinguished based on amount of detail (e.g., brief v. detailed explanations), comprehension (e.g., beginner v. advanced), context (e.g., how to use a control v. what information is needed by the control to perform a task), and presentation style (e.g., examples, definitions, tutorials, etc.), among others.

The integration of the display of a user interface control and its related instructional material is typically performed by displaying at least portions of the control and instructional material in close proximity with one another within a display group such that a recognizable visual link is provided therebetween. A display group may be formed by displaying the control and material within a common display element such as a window, panel, dialog box or the like. Moreover, a display group may be formed by displaying the control and/or material in separate but adjacent display elements (e.g., in a pop-up or "bubble" menu, among others), where a visual link is maintained despite the display of the control and material in separate layers on the computer display.

Abstraction Stack Concepts and Example Body of Knowledge

A number of the hereinafter described embodiments utilize an abstraction stack to represent information from a body of knowledge (BOK) stratified into a plurality of levels of abstraction. The specific details regarding the construction, implementation, and use of an abstraction stack are generally disclosed in the herein incorporated applications entitled "COMPUTER SYSTEM AND METHOD FOR AUTHORING, ABSTRACTING AND ACCESSING A BODY OF KNOWLEDGE" and "COMPUTER SYSTEM, METHOD AND USER INTERFACE COMPONENTS FOR ABSTRACTING AND ACCESSING A BODY OF KNOWLEDGE". The reader is therefore directed to these applications for a more detailed understanding of the specific components discussed herein.

Figure 3:
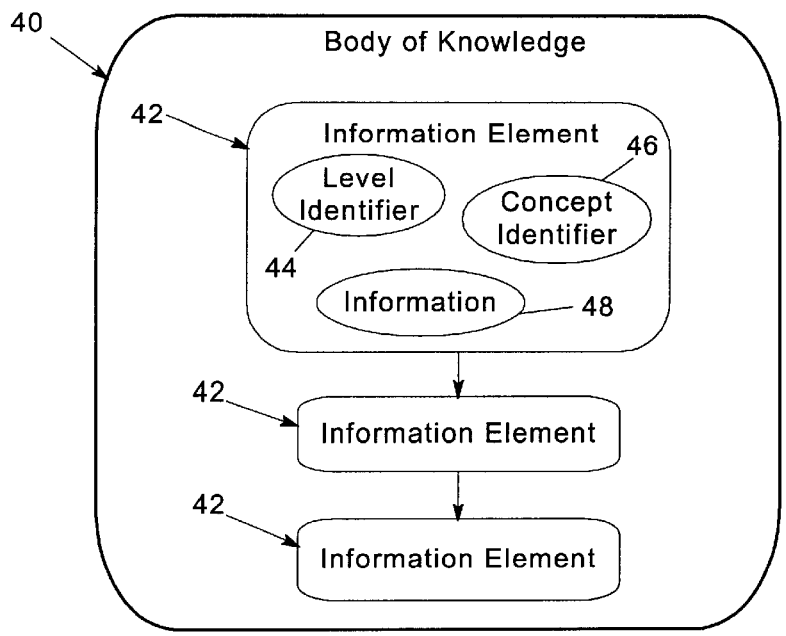
FIG. 3 is a block diagram of the software components in the body of knowledge of FIG. 2.

For example, FIG. 3 illustrates one manner of maintaining a body of knowledge 40 that utilizes an ordered list of information elements 42. An information element typically represents a segment of data that conveys information related to one or more levels of abstraction in a body of knowledge.

Each information element includes a level identifier 44, a concept element identifier 46 and information 48. Level identifier 44 generally represents an author's designation of which if any levels of abstraction are related to the information in the information element, and thus, whether the information element is suitable for presentation in conjunction with the presentation of a particular level of abstraction. The level identifier can have a number of possible values, including a null value, a single level value, a list of level values, a range of level values, a list of ranges of level values, an upper level boundary, a lower level boundary, or any combination thereof.

A level of abstraction typically represents a particular manner of looking at a given body of knowledge, and may be based on numerous criteria. Generally, any abstraction stack may often be considered as addressing audiences with multiple levels of ability and interest. The audiences in some instances are made up of separate individuals. In other instances, a single individual's ability and interest can vary over time so that a single individual represents multiple audiences. As a result, the manner in which levels of abstraction are established for a body of knowledge can determine how different presentations can be tailored to specific audiences.

For example, in the context of user instructional material, levels of abstraction may be defined for different manners of distinguishing alternate presentations of instructional assistance to a user, e.g., based upon amount of detail (e.g., brief v. detailed explanations), comprehension (e.g., beginner v. advanced), context (e.g., how to use a control v. what information is needed by the control to perform a task), and presentation style (e.g., examples, definitions, tutorials, etc.), among others.

Separate levels of abstraction may also be defined for user interface controls. Moreover, user interface controls may be defined in the same or separate levels as user instructional material. Furthermore, to support other information that may be presented to a user in a computer software application, which may or may not be related to any particular user interface controls, other levels of abstraction may be defined, e.g., as described in any of the herein incorporated applications. It should also be appreciated that multiple abstraction schemes may be supported, whereby an information element may include multiple level identifiers to represent different stratifications of the body of knowledge.

Concept identifier 46 generally represents an author's identification of an information element in terms of one or more named concepts. The concept identifier may be used to associate the presentation of a concept at one level of abstraction with those of other levels, as information elements related to the same concept but from different levels will have the same concept identifier. The concept identifier can have any suitable value, e.g., a combination of alphanumeric characters, that provides a unique identification for a particular named concept In addition, the concept identifier can be null to indicate a lack of association with a particular named concept.

In the context of a body of knowledge that includes both user interface controls and instructional material therefor, a concept identifier provides a manner of linking sections of instructional material to specific user interface controls. This permits, for example, a structured manner of managing a group of user interface controls and associated user instructional material, whereby the controls may be maintained in one or more specific level of abstraction, with different sets of instructional material stratified into additional levels of abstraction. With this arrangement, specific user interface controls and associated user instructional material therefor may be linked together via concept identifiers to provide efficient access thereto.

Information 48 generally represents the actual data in the information element that is relevant to the body of knowledge. The information may be as small as a bit (e.g., a flag), or may include an unlimited amount and variety of data, including text data, image data, multimedia data such as audio and/or video data, executable data, etc. As will also become apparent below, information 48 may also include other information elements, whereby nested information elements are supported.

As an example of a body of knowledge suitable for use in the integration of the display of user interface controls with multiple sets of user instructional material, Table I below provides a body of knowledge formatted as a tag delimited document in a hypertext markup language (HTML) format:

TABLE I

Example Body of Knowledge

```
1  <html>
2  <abstack levels=brief overview, catalog, article, method, example>
3  <head>
4  <title>You and your computer</title>
5  </head>
6  <body>
7  <h1>Introduction</h1>
8  <p>Your computer is a powerful, flexible tool you can use to
   understand and manage large complex issues....</p>
   ***
9  <h1>Who's who and what we do</h1>
10 <p>This system supports several fields of endeavor and recognizes
```

TABLE I-continued

Example Body of Knowledge

```
    specific roles for people engaged in these activities. To get your work
    done, you might need to assume one of these roles at one time and
    another at another time. It depends on what you need to do at any
    given moment.
11  ***
12  <infoel cid=sysadm><h2>System administrator</h2></infoel>
13  <infoel lvl=brief cid=sysadm><p>A computer user designated as a
    system or network administrator is responsible for system network
    administration. The administrator implements policies, controls access
    and maintains resources.</p></infoel>
14  <infoel lvl=overview cid=sysadm><p>A system network administrator
    is concerned with helping people use the system's resources as
    intended
    by the owners. The administrator works with the owners to set policies
    controlling authorized users' access to the resources. The administrator
    uses specific system resources to implement the policies, enable
    controlled access and maintain the resources.</p></infoel>
    ***
15  <infoel cid=usrprf><h3>user profile</h3></infoel>
16  <infoel lvl=article cid=usrprf>
17  <infoel cid=usrprf><p>Authorized users are represented on the system
    by user profiles created by the administrator to enable the users'
    controlled access to system resources.</p></infoel>
18  <dl><infoel lvl=catalog cid=usrprf><dt>user profile</dt><dd>User
    profiles are named objects containing information about individual
    people authorized to use system resources.</dd></infoe/></dl>
19  <method lvl=control cid=usrprf, create BOB=userProfile
    BMSG=create>
20  <p>System administrators create user profiles. They hold information
    about people authorized to use system resources. The system uses the
    information to give each user access to appropriate system resources
    and to provide a view of system resources consistent with the user's
    preferences.</p>
21  <hint></hint>
22  <p>The profile's name <hint>BOB.name</hint><input>BOB.name
    </input>is also the person's user ID, and can be set only by the system
    administrator.</p>
23  <p>The profile contains several values initially set by the system
    administrator and modifiable by the user:</p>
24  <p>The user's password<hint>BOB.password</hint><input>
    BOB.password</input>lets the user sign on the system and should
    be known only to the user. The system makes the user change the
    password the first time the user profile is used to sign on the
    system.</p>
25  <p>The user's interface ranges <hint>BOB.interfaceRanges</hint>
    <input>BOB.interfaceRanges</input>control the interface levels
    normally presented to the user.</p>
26  <p>The user's startup folder
    <hint>BOB.startupFolder</hint><input>BOB.startupFolder
    </input> contains links to the programs the system calls when the
    user signs on the system.</p>
27  <input></input>
28  <error></error>
29  <modal></modal>
30  <result></result>
31  </method>
    ***
32  <p>The profile contains several additional values set by the system
    as the user works with the system resources and shows preferences in
    patterns of usage.</p>
33  </infoel>
    ***
34  </body>
35  </abstack>
36  </html>
```

While the above body of knowledge is shown in an HTML format for illustrative purposes, it should be appreciated that any number of data storage formats may be used consistent with the invention. For example, the body of knowledge may be input into the data structure illustrated in FIG. 4 as described in the various herein incorporated applications.

The example body of knowledge is directed to a workplace software objects application that provides a user interface for system resources employed in a user's workspace. The user's workspace might support any field of endeavor, from management of a niche conflict in an ecosystem to administration and use of a computer system network. Such an interface typically includes several abstraction levels and may involve multiple abstraction schemes. It should be appreciated that an innumerable number of applications—directed to practically any known application of computer technology—may be presented in the manner described herein consistent with the invention.

The example application is concerned with administration of a computer system network. It may employ three abstraction schemes and eleven levels. The gross abstraction schemes may be role and resource, with resource including two orthogonal schemes, object and action. Role pertains to the user's role, e.g., system administrator, application administrator, system user, application user, etc. Object pertains to the entities a user may manipulate in performing a role, e.g., for a system administrator, objects such as user profile, printer, communication line, program product, scheduling subsystem, firewall, etc. Action pertains to the things a user does to and with objects in performing a role, e.g., for a user profile object, actions such as create, delete, move, change, display, print, etc. The available levels defined for the example body of knowledge include brief, overview, catalog, article, control, and example, with control expanded into five separate levels: hint, input, error, modal, and result. Brief provides a brief description of the roles. Overview provides an expanded treatment of the roles, typically with references to the more important resources and scenarios showing how their use is coordinated to produce specific results. Catalog provides a list of resources with brief descriptions of the purpose and use of each, and article provides an expanded treatment of each resource with details on its controls and parameters. Example provides illustrations of the use of each resource in accomplishing specific objectives.

Control provides specific methods for specific manipulation of specific entities, i.e., specific intersections of object and action. Within control is defined hint, which is a phrase or clause briefly describing the method or the information the user is to supply through the input level. Input provides a manner of enabling user input of control information. Error provides a manner of receiving system response to syntactical, semantic and contextual errors in the information supplied through the input level. Modal provides a manner of enabling solicitation of additional information when necessary for completion of the activity initiated through the input level, and result provides a manner for the method implementation to return the result of the activity initiated through the input level.

To support the interface between an abstraction stack and executable code, a separate tag "<method>" may be defined as an extension of the HTML protocol to be interpreted by a corresponding extension of the page builder. One suitable implementation of the "<method>" tag is illustrated below in Table II:

TABLE II

Definition of <method> Tag

```
<method
    lvl  = level identifier
    cid  = concept identifier
    BOB  = base object
    BMSG = base message
```

TABLE II-continued

Definition of <method> Tag
>
<hint>object</hint>
<input>object</input>
<error></error>
<modal></modal>
<result></result>
</method>

"lvl" is a master level identifier for the method levels. "cid" is the concept identifier as used with the general information element markup tags. "BOB" identifies the base object to receive and respond to messages sent by the abstraction stack in interpreting the method, and "BMSG" identifies the base message sent to the base object by the abstraction stack in interpreting the method.

The "<hint>" tag defines the hint level of abstraction and provides a location at which to display a hint message received from the object (if any) specified between the "<hint>" and "</hint>" tags. The returned value, which is a phrase or clause briefly describing the object, is displayed at the location of the "<hint>" tag. If no object is specified, the message is sent to the object identified by the BOB and BMSG values from the method tag, e.g., to generate a hint message regarding the base message.

The "<input>" tag defines the input level of abstraction and is used to send an input message to the object specified between the "<input>" and "</input>" tags. The input message results in a returned value that is displayed at the location specified by the "<input>" tag. The returned value is an object that provides some means of input, enabling a user to specify control information. The object is typically a user interface control, e.g., any of the user interface controls identified above, and thus, in response to an "<input>" tag, a displayed representation of the user interface control identified thereby is typically rendered on the display.

If no input object is provided with the tag, a "getEnterButton" or similar message is sent to the object identified by the BOB and BMSG values from the method tag, e.g., to receive an enterButton ("OK" button) or similar manner of indicating that the control information received by the other objects should be processed by the base object. When this manner is used, e.g., the enterButton is pressed, the event manager 100 of FIG. 7 recognizes the event as a BOB event in block 108 and sends the implementation's BOB.BMSG.enterButton object an invocation message calling for processing of the information from the other input objects between the method tags. This typically causes other events such as exception objects or return objects being sent from the BOB.BMSG object to a method element object (MEO), discussed below, through the event manager 100 of FIG. 7 The event manager recognizes these objects as messages for an MEO at block 112 and sends them to the method manager which routes them to the appropriate MEO.

The "<error>" tag defines the error level, and specifies the location at which to display an error object thrown by the BOB's method implementation whenever a syntactic, semantic, contextual or other error results from the input information assembled in the message exchange. The "<modal>" tag defines the modal level, and specifies the location at which to display a modal object thrown by the BOB's method implementation. A modal object may be thrown if additional input is necessary for completion of the activity specified through the message exchange. The modal object may provide elements such as those used at the input level to solicit information, and may include additional elements such as dialog boxes, additional abstraction stack lenses and levels, or even supplemental abstraction stacks. The "<result>" tag defines the result level, and specifies the location at which to display a result object thrown by the BOB's method implementation. The object may use elements from a range of forms to confirm completion, indicate partial completion or indicate failure of the activity. Moreover, the object may be the actual results in the form or text, graphics or other information suitable for presentation in a lens, or as a new body of knowledge presented within a supplemental abstraction stack.

It should also be apparent from Table I that the use of nested information elements is supported, whereby any information elements between the pair of information element tags at lines 16–33, unless overridden by specific level and/or concept identifiers, is designated with a level identifier of "article" and a concept identifier of "usprf".

As discussed above, an abstraction stack is utilized to access and/or manipulate the information stored in a body of knowledge, e.g., body of knowledge 40. One suitable implementation of an abstraction stack is illustrated at 50 in FIG. 4. The abstraction stack includes two primary components, a depth manager 60 and a flow manager 80. Depth manager 60 generally maintains the data structure of the abstraction stack and handles rendering of the abstraction stack on a computer display. Flow manager 80, on the other hand, generally handles the user interaction with the data structure to modify the manner in which the body of knowledge is displayed within the abstraction stack's lenses.

Depth manager 60 generally handles the data structure of the abstraction stack as well as rendering of the abstraction stack on a computer display. The data structure of the abstraction stack includes a plurality of objects representing different abstraction stack components. These components generally include a depth vector 62, a set of lenses 64, compass handles 65, binder bands 66 and intersection points 68, each of which is discussed in greater detail in the herein incorporated applications.

Flow manager 80 generally handles the user interface with the abstraction stack data structure to modify how the body of knowledge is displayed within the abstraction stack's lenses, including handling information flow to the various lenses displayed for the abstraction stack. Flow manager 80 is coupled to depth manager 60 through a number of client/server pairs shown at 52. The client/server pairs 52 couple together lenses with filters and a working copy of the body of knowledge, and generally function to control the flow of information from the body of knowledge into a lens.

Flow manager 80 also includes a number of objects that are utilized to handle user interaction with the abstraction stack. For example, flow manager 80 utilizes one or more filter objects 82 to define the manner in which information is displayed in suspended lenses. A list of available named concepts 84 is also maintained by flow manager 80 to determine when to visually link together information that is related to a particular concept when information from different levels of abstraction is concurrently displayed.

In addition, a page builder object 86 is used in flow manager 80 to control how an abstraction stack is viewed in a computer display. The page builder, which may be similar in many respects to a component of a conventional web browser, includes a number of type managers 88 that are used to handle different types of information from a body of knowledge. For example, separate type managers may be provided for handling text information, graphical information, audio information, video information, animation information, and method information, among others. To this extent, a separate working copy 54 of the body of knowledge is used by page builder 86 for each lens-filter pair during viewing so that appropriate links to different types of information (especially executable methods) may be maintained.

Figure 5:
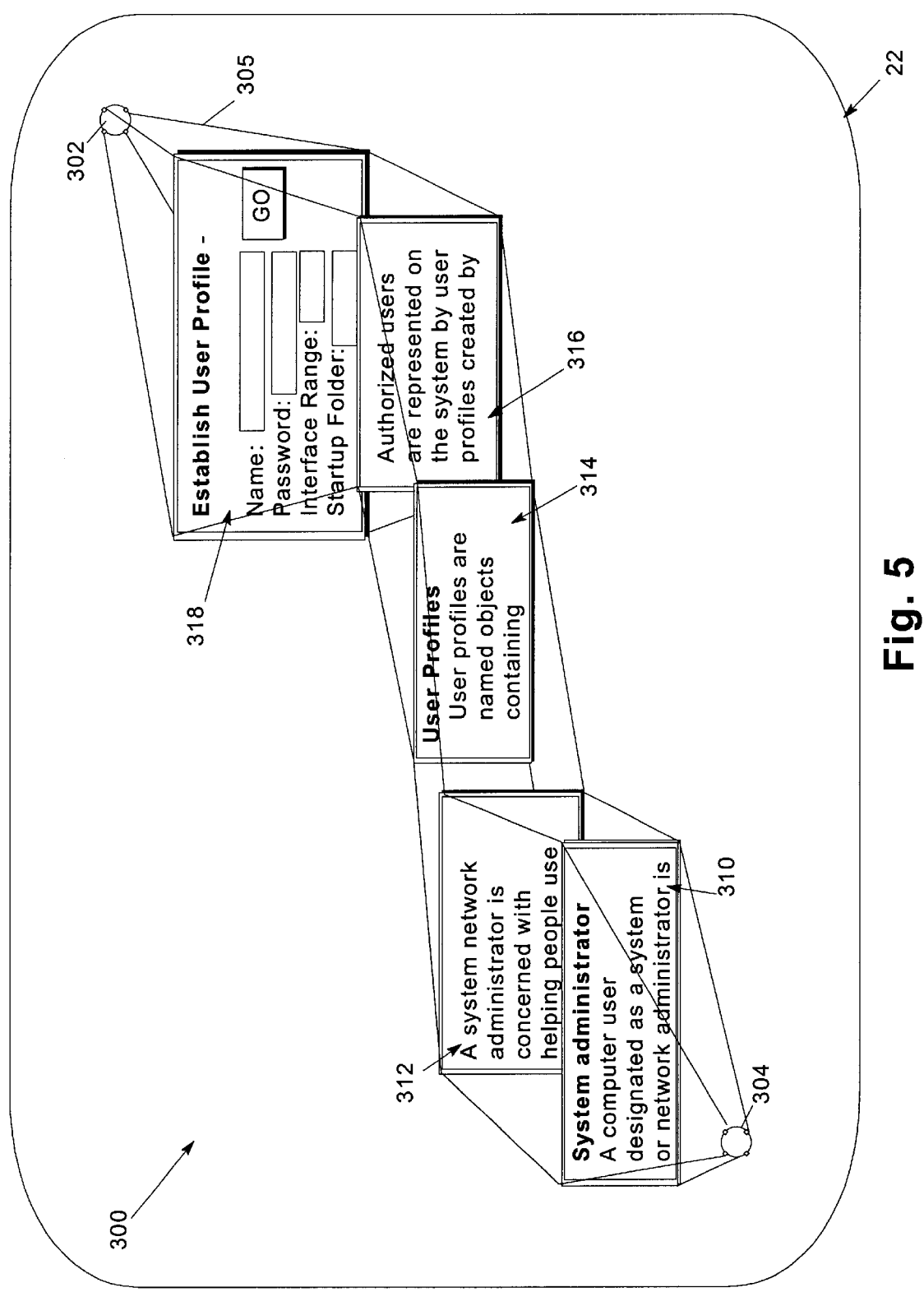
FIG. 5 is a block diagram of a computer display illustrating a representation of the abstraction stack of FIG. 4.

Turning briefly to FIG. 5, which provides a representation of an abstraction stack 300 consistent with the invention, an abstraction stack generally provides a visual manner of organizing multiple levels of abstraction. Each level of abstraction in a body of knowledge is typically represented in an abstraction stack by a focal plane organized along a common depth vector, or abstraction axis, extending generally perpendicular thereto. The focal planes are organized along the depth vector based upon the manner of categorizing the levels of abstraction. For example, if levels of abstraction relate to different levels of detail, the focal planes may be organized sequentially based upon the relative levels of detail for their associated levels of abstraction.

An abstraction stack functions to display information from one or more focal planes in such a manner that the different focal planes are organized in a three-dimensional workspace such that the relative arrangement of the focal planes is readily apparent therefrom. Focal planes are generally handled as two-dimensional virtual constructs, with the depth vector upon which focal planes are organized representing the third dimension of the stack. As a result, display of an abstraction stack on a two-dimensional display such as a video monitor often requires three-dimensional modeling techniques to be utilized to provide a three-dimensional rendering of an abstraction stack. It should be appreciated that a depth vector is principally an organizational construct, and may or may not be displayed on a computer display.

One type of object in an abstraction stack is a lens, e.g., lenses 310, 312, 314, 316, and 318, which typically serves as a point of attachment and focus point along the abstraction stack for stack manipulation and content. A lens is typically used to display the information from one or more levels of abstraction. In addition, a lens is typically represented in much the same manner as a GUI window, with controls such as resizing handles, minimizing handles, scroll bars, etc. used to modify the appearance and content displayed in the lens, if desired.

Another type of abstraction stack object data structure is a compass handle (e.g., handles 302 and 304), which are typically located at an end of a depth vector of an abstraction stack. A compass handle typically functions as an endpoint of the abstraction stack, and may function as a focal point for manipulation of and access to a minimized or maximized abstraction stack. In addition, a compass handle may be used as a point of attachment to other related abstraction stacks for a particular body of knowledge.

Another object in the abstraction stack data structure is a binder band, which provides one manner of visually representing the hierarchical arrangement of levels of abstraction via visually connecting other objects displayed along a depth vector of an abstraction stack. One subclass of a binder band is a shaft band (e.g., shaft band 305), which generally links together objects associated with different levels of abstraction in a body of knowledge. Another subclass of a binder band is a strata band (not shown), which generally links together objects associated with the same level of abstraction in a body of knowledge. A binder band is typically represented by one or more connecting elements that extend between two other displayed objects. For example, in one embodiment, a binder band may be represented by four lines extending between corresponding corners of two objects. Other numbers of lines, as well as other forms of connecting elements, may be used to represent a binder band in the alternative.

Other abstraction stack objects, discussed in greater detail in the herein incorporated applications, may also be provide in abstraction stack 300 consistent with the invention. The reader is therefore directed to such applications for a better understanding of the implementation and use of such objects.

Lenses, which are much like windows in common GUI environments, may be created and manipulated to modify the presentation of information from a body of knowledge. Lenses differ from windows in the manner in which they are related to one another. That is, lenses provide coordinated views of a body of knowledge at different levels of abstraction and are visually manifested in a three-dimensional representation that reflects the stratification of the body of knowledge. Lenses are typically peers, owned by the depth manager responsible for the three-dimensional space in which they appear. Windows are related in a parent-child or master-owner relationship, and are visually represented with randomly determined three-dimensional aspects that reflect no underlying organization of the information they convey within their viewing areas.

For example, lenses may be related through a coordinated scrolling relationship, whereby multiple lenses may be coordinated to display different views of essentially the same concepts in a body of knowledge, with coordinated scrolling provided to ensure that the lenses track one another as lenses are scrolled to display other concepts in a body of knowledge. To this extent, lenses in an abstraction stack are typically grouped into one or more lens sets. Each lens set typically has associated therewith a current location or position in the body of knowledge that is consistent across each lens in the lens set. Each lens, however, may also have start and end boundaries, referred to herein as shallow and deep bounds, that define at the extent of a "window" or segment of information from the body of knowledge that is displayed in a particular lens. By maintaining the current position for the lens set between the shallow and deep bounds of each lens in the lens set, the lenses are permitted to track one another during scrolling operations.

Lenses in a coordinated scrolling lens set are typically, but not necessarily, disposed along the depth vector and connected by shaft bands such as shaft bands 105. Lenses that are disposed along a depth vector may be considered as depth vector lenses, and are typically either primary or secondary lenses. Primary and secondary lenses are associated in a common lens set, with the only difference therebetween being that a primary lens is the focus of a user's interaction with the abstraction stack in navigation of the body of knowledge, while a secondary lens is typically modified automatically in response to user operations on the primary lens. A secondary lens typically displays the same concepts as a primary lens, albeit with an independent filter configuration that provides an alternate view of essentially the same information in the body of knowledge. In addition, a secondary lens may be activated to become the primary lens, whereby the prior primary lens then becomes a secondary lens.

Each lens also has associated therewith a filter that defines how the lens displays information from the body of knowledge. Specifically, a filter for a lens typically defines whether a lens passes or blocks information elements from each level of abstraction. In addition, for each level of abstraction passed by the filter, the filter defines how the information elements therefrom are transformed, if at all, when displayed in the lens.

The types of filters that may be useful in an abstraction stack typically varies depending upon the manner in which a body of knowledge is stratified into levels of abstraction, which may be referred to as an abstraction scheme. A body of knowledge may be represented by one abstraction scheme or by multiple abstraction schemes, with one or more of such schemes specifically defined by an author or developer, and/or with one or more of such schemes inherently defined, e.g., based upon standard document components or data types.

For example, for abstraction stack 300 of FIG. 5, lens 310 is configured to pass only the brief level of abstraction, lens 312 is configured to pass only the overview level of abstraction, lens 314 is configured to pass only the catalog level of abstraction, and lens 316 is configured to pass only the article level of abstraction. Lens 318 is configured to pass the control levels (hint, input, error, modal and result) so that each method and input parameter therefor (each representing a user interface control) is integrated with a brief identification thereof. An additional lens (not shown) may also be included, for example, to pass an example level of abstraction and illustrate example input to the method.

Various user manipulations of lenses may be performed. For example, as discussed above, it may be desirable to provide coordinated scrolling between lenses in a lens set. In addition, it may also be possible to link together information elements relating to named concepts, e.g., so that movement of a link pointer over an information element directed to a specific named concept results in the highlighting of other displayed information elements matching the named concept. Typically, but not necessarily, link pointer operation is limited to moving a pointer over an information element in the primary lens of a lens set, and is typically initiated in response to a "cross over" event as is known in the art.

Lenses and/or lens groups may also be represented in minimized or maximized representations. A minor lens typically is utilized to represent a minimized lens, and is typically arbitrarily small so that its minimized representation is apparent to a user. A maximized lens is typically represented by a prime lens, with a collapsed abstraction stack typically displayed concurrently with a prime lens to maintain a visual relationship of the prime lens within the abstraction stack as a whole.

User interaction with the abstraction stack is principally handled by a pointer (not shown in FIG. 5) that is manipulated by one or more user interface devices such as a mouse, a trackball, a keyboard, a touch pad, etc. A pointer may be placed into one of several modes, and may also be used in such operations as switching focus between lenses, highlighting information for cut and paste operations, etc. Other uses of the pointer include various conventional pointer-based actions, such as resizing, moving, closing and similar window operations, selection of menu entries, and selection of buttons, among others.

Additional user interface controls and operations may be implemented in an abstraction stack consistent with the invention. For example, a lens may include various conventional GUI window controls such as a close button, a minimize button, a maximize button, a title bar, resizing handles, scroll bars, drop-down menus, toolbar buttons, etc.

A user may also be permitted to select a binder band (e.g., through single or double-clicking on the binder band) to open any adjacent minor lenses thereto, as well as optionally close any other lenses in the lens set. Lenses may also be maximized (e.g., through selection of a maximize button thereon or double-clicking on the title bar thereof), resulting in the display being switched to a prime lens view where the lens substantially fills the computer display, with only a collapsed representation of the remainder of the abstraction stack displayed.

Individual lenses in an expanded abstraction stack may also be manipulated by a user as desired. For example, lenses may be selected to control which lens is designated the primary lens for receiving user input. In addition, movement and/or resizing of lenses may be performed. Movement or resizing of a lens in a lens group or set typically modifies only that lens, although group movement and resizing operations may also be supported. However, even when a lens is resized or moved, the location of the lens along the depth vector relative to other lenses is preferably maintained so that the contextual relationship therebetween is also maintained. The position along the depth vector for a lens may be varied, but preferably not in such a manner that a lens is permitted to switch relative positions with another lens on the stack.

Movement or resizing of a lens may be performed in a number of manners consistent with the invention. For example, similar to conventional GUI windows, a lens may be moved by dragging its title bar or by using arrow keys when in a predetermined mode. Resizing of a lens typically may be performed using conventional resizing handles (e.g., by dragging the boundaries of the lens).

More preferably, however, various alternate movement mechanisms may be used in addition to and/or in lieu of conventional mechanisms. One suitable manner of moving or resizing a lens is through collision of pointer with a boundary of the lens when the pointer is in a collision resizing or movement manipulation mode. With this feature, which is the subject of the aforementioned incorporated application entitled "COMPUTER SYSTEM AND METHOD OF MANIPULATING A WINDOW ON A COMPUTER DISPLAY THROUGH COLLISION WITH A POINTER", movement of a pointer along a first vector moves a boundary segment of a lens along a second vector if it is determined that the first vector intersects that boundary segment. In a movement mode, the boundary segment is moved in conjunction with all other boundary segments to effectively move the lens. In a resizing mode, other boundary segments remain fixed to effectively resize the lens. The pointer may be defined to have a single position from which the first vector extends, or in the alternative, a proximity range may be defined around the pointer, with a boundary thereof used to test for collisions with a boundary segment of a lens.

This type of pointer manipulation, which is also referred to as a "bumper-jumper" operation, typically results in the appearance of a pointer "bumping" or "pushing" a lens as the pointer collides with the lens. The mode can be selectively enabled or disabled, including a temporary enabling or disabling operation (e.g., by holding down a control key during pointer movement) that permits a user to quickly and selectively "bump" or "jump" over any given boundary as desired. In addition, collision may be selectively detected only when contacting a boundary segment from outside a lens, and/or only when contacting a boundary segment while within the boundary of a lens.

Another suitable manner of moving or resizing a lens that may be used in lieu of or in conjunction with collision manipulation is that of proximity manipulation, such as is described in detail in the aforementioned incorporated application entitled "COMPUTER SYSTEM AND METHOD OF MANIPULATING MULTIPLE GRAPHICAL USER INTERFACE COMPONENTS ON A COMPUTER DISPLAY WITH A PROXIMITY POINTER". When in a proximity manipulation mode, lenses within a predetermined proximity range disposed around a proximity pointer may be resized or moved as a group in response to user manipulation of the pointer, thereby permitting faster manipulation of multiple objects at once.

It should be appreciated that other variations disclosed in the herein incorporated applications may also be implemented consistent with the invention. In addition, other manners of manipulating the lenses will be apparent to one of ordinary skill in the art. For example, given that a body of knowledge may be represented in a tag-delimited format such as HTML, it should also be appreciated that hypertext links and the like may be embedded in the body of knowledge such that a user can navigate to predetermined locations in the same or different lenses specified in the embedded links simply by selecting those links. Links may also be associated with particular locations in the body of knowledge, so that each lens in a lens set is scrolled in a coordinated fashion to display its particular representation of that location in the body of knowledge. Other user-coordinated operations may also be performed on the abstraction stack consistent with the invention.

Abstraction Stack Implementation

Figure 6:
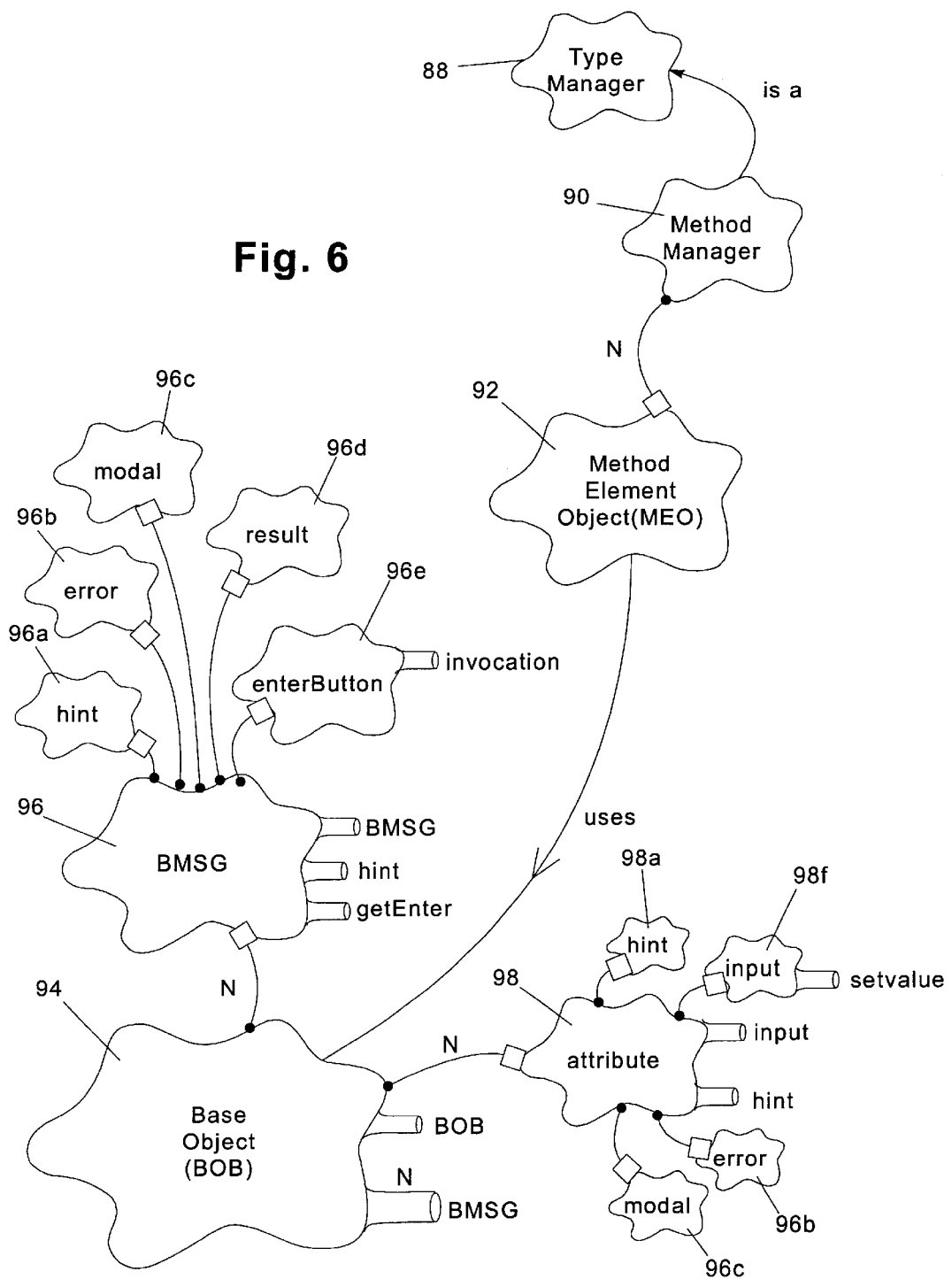
FIG. 6 is an object diagram illustrating the interaction of the abstraction stack of FIG. 4 with a method element object consistent with the invention.

Returning to FIG. 4, as discussed above page builder 86 of flow manager 80 maintains a working copy 54 of the body of knowledge in part for the purpose of linking abstraction stack 50 to one or more executable objects, referred to hereinafter as methods, so that one or more user interface controls may be embedded within abstraction stack 50 consistent with the invention. As shown in FIG. 6, this linking may be implemented in an object-oriented environment using a method manager 90 (which is a subclassed type manager 88) that handles interaction with one or more method element objects (MEO's) 92 that handle interactions with executable methods that provide discipline-specific functions in a computer system.

Each MEO 92 uses an instance of a base object (BOB) 94 that is configured to receive and respond to messages sent by the abstraction stack in interpreting a specific method. BOB.BOB is a constructor used to instantiate a new instance of a BOB object. BOB.BMSG is a function that returns a reference to a base message (BMSG) object 96, thus enabling access to the functions supported by BMSG object 96, for use by an MEO.

Each BOB 94 may support a number of BMSG's 96 that may be sent to the base object by the MEO in interpreting the method. Each BMSG 96 has a number of objects 96a–96e supporting the various messages that may be passed between the MEO and BMSG. Objects 96a, 96b, 96c, and 96d are respectively linked as will be described below to the "<hint>", "<error>", "<modal>", and "<result>" tags in a method element within the body of knowledge. Object 96e supports an enterButton. invocation method for the object, and is linked to an invocation user interface control such as an "ok" or "go" button displayed in the abstraction stack to permit a user to invoke the method for the base object based upon the user input supplied to the various user interface controls therefor. BMSG.BMSG is a constructor used to instantiate a new instance of a BMSG object, for use by a BOB. BMSG.hint is a function that returns an object, such as a character string, containing a brief description of the purpose and use of the BMSG, for use by an MEO. BMSG.getEnter is a function that returns a reference to an enterButton object, also for use by an MEO.

Each BOB 94 may also have a number of attributes 98 representing the data stored for each base object. Each attribute 98 has objects 98a, 98b, 98c and 98f, which are respectively linked to the "<hint>", "<error>", "<modal>", and "<input>" tags in the body of knowledge. Input.setvalue is a function that updates the value of the attribute, e.g., in response to the input cursor exiting a particular input field. Attribute.input is a function that returns a reference to an input object, for use by an MEO. Attribute.hint is similar to BMSG.hint in that it returns an object with a brief description of the purpose and use of the attribute, for use by an MEO.

The operation and usage of an abstraction stack consistent with the invention is now described. As discussed above, an event-driven system may be utilized herein to handle user interaction with an abstraction stack. As such, a main routine for event manager 37 of operating system 36 (FIG. 2) is illustrated at 100 in FIG. 7. It should be appreciated that non-event-driven implementations may be utilized in the alternative.

Figure 7:
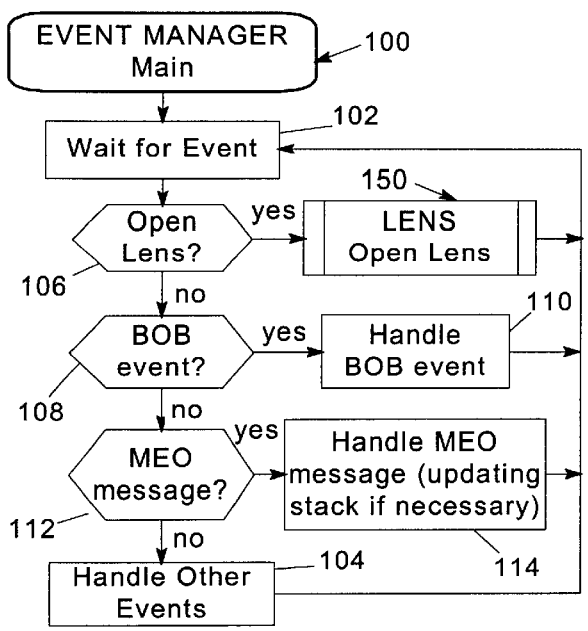
FIG. 7 is a flowchart illustrating the program flow of a main routine consistent with the invention.

Routine 100 may be considered to operate in an endless loop—typically as a dedicated process running in the background of operating system 36. As is well-known in the art, routine 100 waits for events at block 102 and passes such events to appropriate handling routines. Several such events consistent with the invention are detected at blocks 106, 108 and 112. Also shown in FIG. 7 is a block 104 that handles the multitude of other types of events generated in the computer system, but which are not relevant to an understanding of the invention.

Furthermore, any of the various events described in the herein incorporated applications may also be detected and handled in the manners described therein, e.g., initialize stack events, render stack events, create lens events, scroll events, cross-over events, etc. In general, an abstraction stack described herein utilizes many of the same events and processes in its implementation, with the primary differences highlighted herein. Where no modifications to these other events are pointed out herein, it should be assumed that such other events may be handled in a similar manner, and as such the reader is therefore directed to the herein incorporated applications for a more detailed discussion of such other events.

One event that differs somewhat from that described in the herein incorporated applications is an open lens event, which is detected by block 106 and handled by an open lens routine 150. An open lens event, which occurs generally after a stack has been initialized and after a lens has been created, refreshes the abstraction stack to display a created lens. Consistent with the invention, the open lens event displays one or more user interface controls embedded in a lens if such lens has a filter configured to display one or more methods linked to the body of knowledge.

An additional event that may be utilized by the abstraction stack is a BOB event, which is detected in block 108 and handled in block 110. A BOB event is sent by an MEO or other stack entity to call a specified function in the BOB, e.g,. to invoke the BOB, set the value of an attribute, retrieve a hint or a reference to an input object or user interface control, etc.

Another event that may be utilized by the abstraction stack is an MEO message, which is detected in block 112 and handled in block 114. An MEO message represents any event or message passed from a base object to an MEO, e.g., a result, an error message, a modal request, etc. It is in part through this mechanism that information is exchanged between an abstraction stack and various executable methods that may be invoked via the abstraction stack (events may also be passed from the abstraction stack to various method objects consistent with the invention, as described below). Typically, such an event is handled in a manner appropriate for the particular method and user interface control referenced by the event, with the abstraction stack updated as necessary to reflect any modifications to the abstraction stack as a result of the event. In many applications, it may be suitable to simply call fill lens routine 170, described below in connection with FIG. 9, to handle such methods. In other applications, it may be desirable to utilize another routine, e.g., if it is not necessary to re-render a complete lens as a result of the event.

Figure 8:
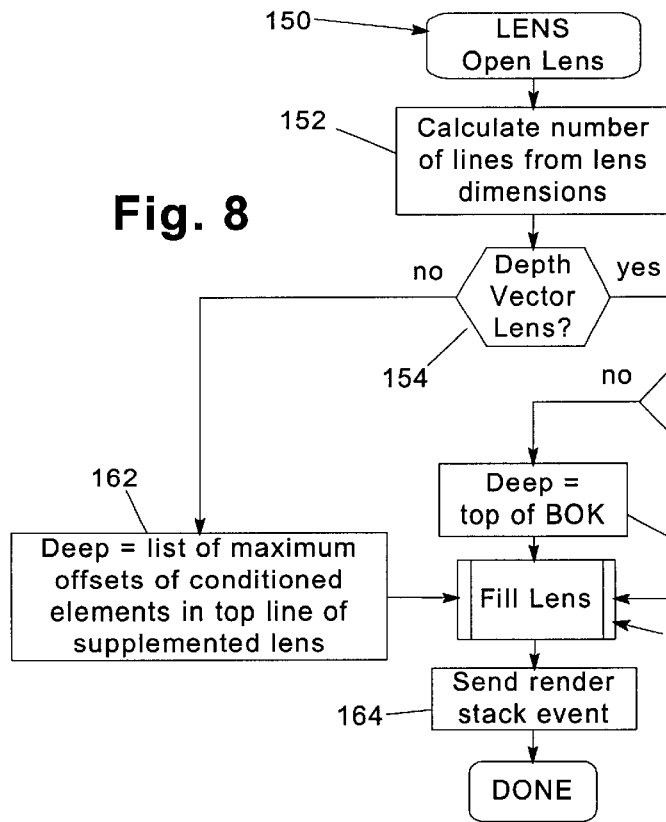
FIG. 8 is a flowchart illustrating the program flow of the open lens routine of FIG. 7.

Open lens routine 150 is illustrated in greater detail in FIG. 8. An open lens is generally any lens that is not minimized (such as a minor lens), and which displays a portion of the body of knowledge. As will become more apparent below, each lens is defined to include shallow and deep bounds, representing the boundaries of the lens generally in terms of start and end locations in the body of knowledge.

A page builder 86 operates within a lens to render conditioned BOK source elements within a line cache to form an array of display-ready "cells" for display within the lens. The line cache includes a sequence of line structures, each including a lens-wide array of display ready cells and a list of conditioned element structures. Each cell may represent, for example, an image (e.g., a bitmap) of a character or a portion of an image the same size as a character. Each conditioned element structure represents a portion of the body of knowledge that has been filtered and has been processed to condition nested and executable tags, among others. Each conditioned element structure may include a conditioned element identifier, beginning and ending cell indexes, minimum and maximum cell (or BOK) offsets, and a concept identifier.

The beginning and ending cell indexes indicate the first and last line cells occupied by a conditioned element. Special values may be assigned for "before", indicating for the beginning index that the first cell for the conditioned element is on a previous line, "after", indicating for the ending index that the last cell for the conditioned element is on a subsequent line, and "not" for both indexes indicating that the conditioned element does not occupy any cells. The minimum and maximum offsets indicate the first and last cells from the conditioned element represented on the line. So, "not" for both indexes, with the minimum offset equal to zero and the maximum offset equal to nine, may represent a ten-character word that has been blocked by the filter. Similarly, a minimum offset of zero with a maximum offset of 999 may represent a 1000-character paragraph that has been blocked by the filter.

The shallow bound for a lens is defined as the minimum cell offset for the first conditioned element (e.g., with the lowest conditioned element identifier) for the top line of the lens. The deep bound for a lens is defined as the maximum cell offset for the last conditioned element (e.g., with the highest conditioned element identifier) for the bottom line of the lens. It is also desirable to respectively maintain in the shallow and deep bounds lists of the minimum and maximum offsets for all of the conditioned elements within the top and bottom lines of the lens, respectively. Two other values, minimum line offset and maximum line offset, may also be defined. The minimum line offset may be defined as the minimum cell offset for the first conditioned element on the line, and the maximum line offset may be defined as the maximum cell offset for the last conditioned element on the line.

Since portions of the body of knowledge may be filtered out via the filter for each lens, it should be appreciated that each line displayed in a lens may represent a different quantity of information in the body of knowledge. Accordingly, it is desirable to maintain the shallow and deep bounds in terms of locations within the body of knowledge, and thus, independent of the particular information displayed in a lens.

Routine 150 begins in block 152 by calculating the number of lines for the lens based upon its current dimensions. The dimensions that may affect the number of lines displayed include the height and width of a lens, as well as an optional zoom factor for the lens that determines the size of the information that will be displayed therein. In addition, the number of lines for the lens may be dependent upon the font size for textual information displayed in any given focus effect (e.g., normal, highlighted, or obscured), or on the current resolution of the display. Calculation of the number of lines to display in a window, however, is a routine operation that is well known in the art.

Next, block 154 is executed to determine whether the lens is a depth vector lens. If it is, block 156 is executed to determine whether any lens in the current lens set is already open. If so, block 158 is executed to set the deep bound for the lens to initially be equal to a list of maximum line offsets for the conditioned elements in the top line of the primary lens in the current lens set. If not, block 160 is executed to set the deep bound for the lens to initially be equal to a value representing the top of the body of knowledge. Retuning to block 154, if the lens is a supplementary lens, block 162 is executed to set the deep bound for the lens to initially be equal to a list of maximum line offsets for the conditioned elements in the top line of the supplemented lens therefor.

After execution of any of blocks 158, 160 or 162, a fill lens routine 170 is called to fill the lens with information, and a render stack event is issued in block 164 to refresh the display of the abstraction stack on the computer display (described in greater detail in the herein incorporated applications). Routine 150 is then complete.

Figure 9:
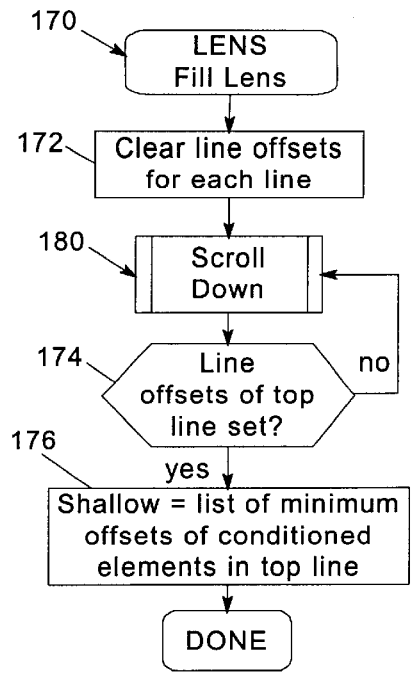
FIG. 9 is a flowchart illustrating the program flow of the fill lens routine of FIG. 8.

Fill lens routine 170, which is illustrated in greater detail in FIG. 9, generally operates to push lines of information from the body of knowledge sequentially into the bottom of the lens until the lens is full of information. Routine 170 receives a deep bound that initially points to the start location for the lens in the body of knowledge. The initial value stored in the shallow bound is not important, as routine 170 updates this value prior to termination. As will become apparent below, the deep bound is automatically updated as information is pushed into the bottom of the lens such that, upon completion of routine 170, the deep bound points to the end location for the lens in the body of knowledge.

Routine 170 begins in block 172 by clearing the minimum and maximum line offsets for each line. Next, a scroll down routine 180 is called to push a line of information into the bottom of the lens, while calculating the line offsets for the line and inherently updating the deep bound accordingly. Next, block 174 determines whether the line offsets for the top line of the lens are set, indicating that the lens is full of information. If not, routine 180 is again called until the lens is full. Once the lens is full, block 176 is executed to update the shallow bound for the lens to include a list of the minimum offsets for the conditioned elements in the top line of the lens. Routine 170 is then complete.

Figure 10:
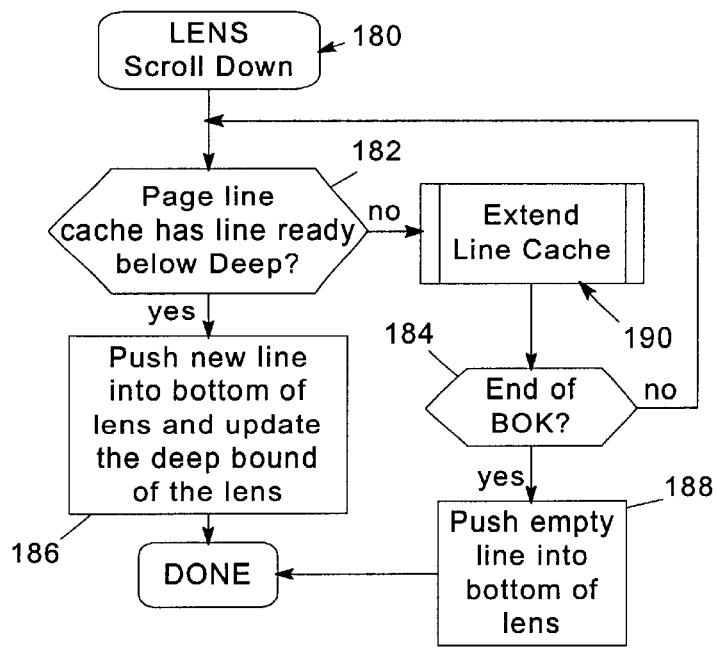
FIG. 10 is a flowchart illustrating the program flow of the scroll down routine of FIG. 9.

FIG. 10 illustrates scroll down routine 180 in greater detail. Routine 180 maintains a line cache of rendered cells for placement within a lens. The routine begins in block 182 by determining whether the line cache has a line ready to be pushed into the lens, indicated by the existence of a line of information below the deep bound for the lens. If not, extend line cache routine 190 is called to add information to the line cache. As long as the end of the body of knowledge is not detected as a result of this routine, block 184 then passes control back to block 182 to determine whether a line is ready to be pushed into the bottom of the lens. However, if the end of the body of knowledge is detected, block 188 is executed to push an empty line into the bottom of the lens. Returning to block 182, once a line is available in the line cache, control is passed to block 186 to push the line into the lens, in a manner generally known in the art, and to update the deep bound of the lens. Upon completion of either of blocks 186 or 188, routine 180 is complete.

Figure 4:
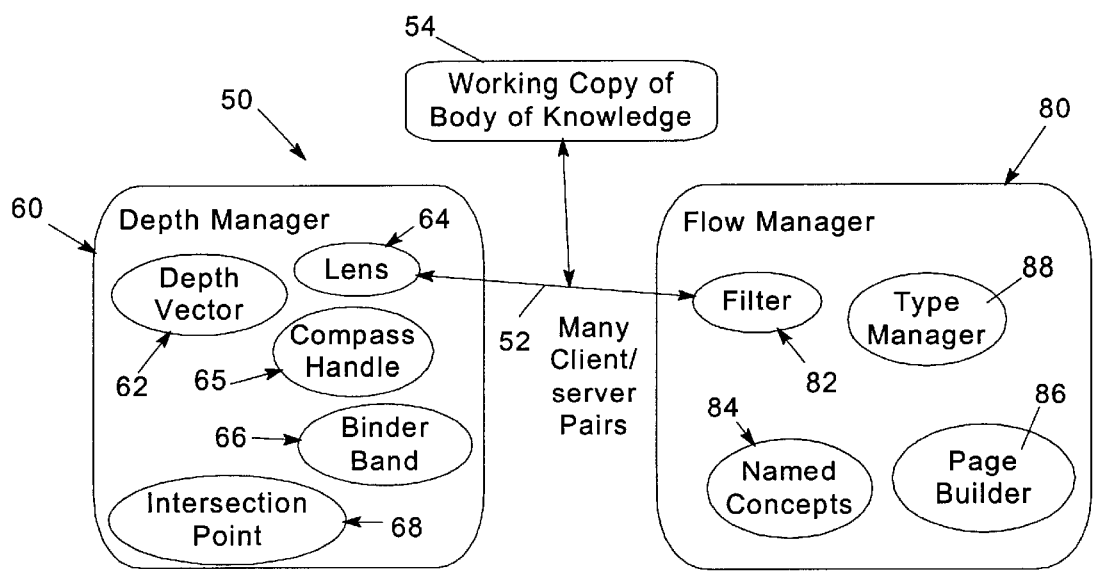
FIG. 4 is a block diagram of the software components in the abstraction stack of FIG. 2.
Figure 11:
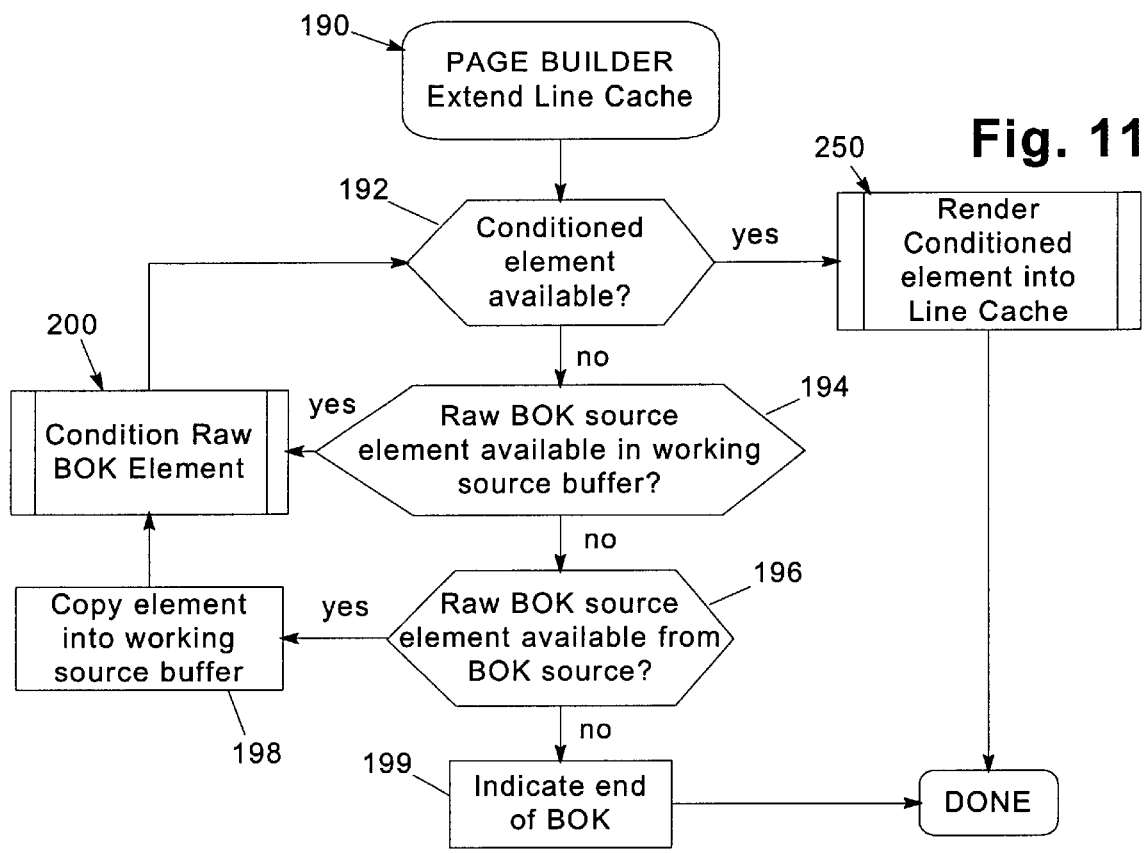
FIG. 11 is a flowchart illustrating the program flow of the extend line cache routine of FIG. 10.

Extend line cache routine 190 is illustrated in greater detail in FIG. 11. Routine 190 begins in block 192 by determining whether a conditioned element is available, typically indicated by its presence in a conditioned source cache for such elements (discussed below). If so, the element is rendered into the line cache by routine 250, and routine 190 terminates. If not, control passes to block 194 to determine whether a "raw", or unprocessed BOK source element is available in a working source buffer (e.g., within the working copy of the body of knowledge 54 for the lens, as shown in FIG. 4). If so, the raw element is conditioned into a conditioned element by routine 200, prior to returning control to block 192. If not, control passes to block 196 to determine whether a raw BOK source element is available from the BOK source—e.g., the master body of knowledge 40. If so, control passes to block 198 to copy such element into the working source buffer, prior to calling routine 200 to condition the element into a conditioned element. If not, however, the end of the body of knowledge has been detected, whereby control passes to block 199 to indicate such and terminate the routine.

Figure 12:
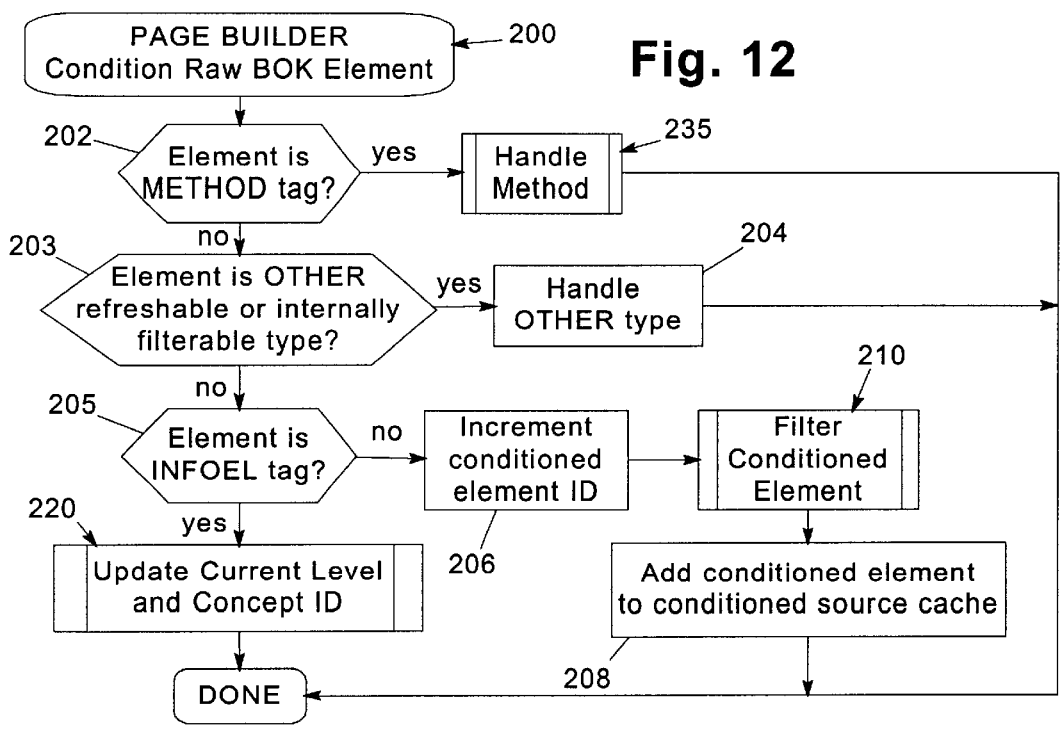
FIG. 12 is a flowchart illustrating the program flow of the condition raw BOK element routine of FIG. 11.

Routine 200 is illustrated in greater detail in FIG. 12. The routine begins in block 202 by determining whether the raw element is a METHOD tag—that is, whether the information element is directed to an executable method indicated by the presence of a "<method>" tag in the element. If so, a handle method routine 235 is called and routine 200 is complete.

If, however, the element is an OTHER element, indicating that the element is directed to a refreshable or internally filterable element, typically other than simple text, control passes to block 204 to handle such type in a manner similar to that described below. For example, it may be desirable to permit image files to include multiple images that would be alternately displayed based upon the particular filter criteria of the lens, whereby such alternate images would be rendered as a component of this operation.

If the element is not an OTHER element, control passes to block 205 to determine whether the element is an INFOEL tag—that is, whether the element includes an "<infoel>" or "</infoel>" tag. If not, control passes to block 206 to increment a conditioned element identifier variable for use in defining a new conditioned element. Next, a new conditioned element is created by a filter conditioned element routine 2 10, and the created conditioned element is added to the conditioned source cache in block 208. Returning to block 205, if the conditioned element is an INFOEL tag, the current level and concept identifiers are updated by routine 220. Upon completion of either block 208 or routine 220, routine 200 is then complete.

Figure 13:
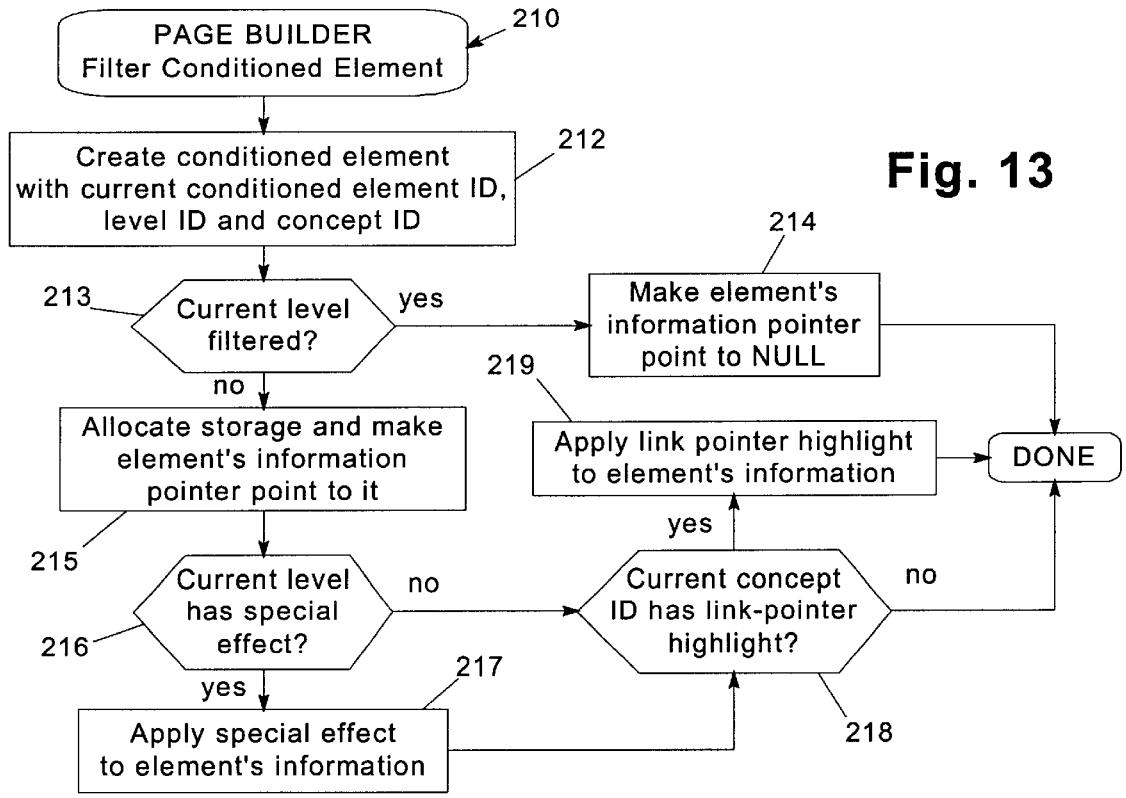
FIG. 13 is a flowchart illustrating the program flow of the filter conditioned element routine of FIG. 12.

Routine 210 is illustrated in greater detail in FIG. 13. Routine 210 begins in block 212 by creating a conditioned element using the current value of the conditioned element identifier (set above in block 206), as well as the current level and concept identifiers (discussed below). The conditioned element includes an information pointer that points to a block of storage representative of the conditioned source from a portion of the body of knowledge, or NULL if no such information is included in the element. Typically, the information included within a given conditioned element includes all information between any two "special" tags separately handled in routine 200—namely, the "<method>", "</method>", "<infoel>", and "</infoel>" tags, along with any tags for OTHER types of information.

Next, block 213 determines whether the current level identifier is filtered by the current filter configuration for the lens. If so, control passes to block 214 to set the information pointer for the element to point to NULL, and routine 210 terminates. If not, control passes to block 215 to allocate storage for the conditioned element and point the information pointer for the conditioned element to point to the allocated storage. In addition, it is within this allocated storage that the information for the element is stored.

Next, block 216 is executed to determine whether the current level has a special (focus) effect associated therewith in the current filter configuration associated with the lens. If so, control is diverted to block 217 to apply the effect to the element's information. As discussed above, for example, different effects may be applied to information associated with the various levels in a lens so that different levels of abstraction may be distinguished in the lens.

Irrespective of whether a special effect is applied to the element, control then passes to block 218 to determine whether a link pointer highlight should be applied to the element's information based upon the current concept identifier. If so, control is diverted to block 219 to apply the highlight to the element's information, in a manner discussed in the aforementioned incorporated applications. Next, irrespective of whether a highlight is applied to the element, routine 210 is terminated.

Figure 14:
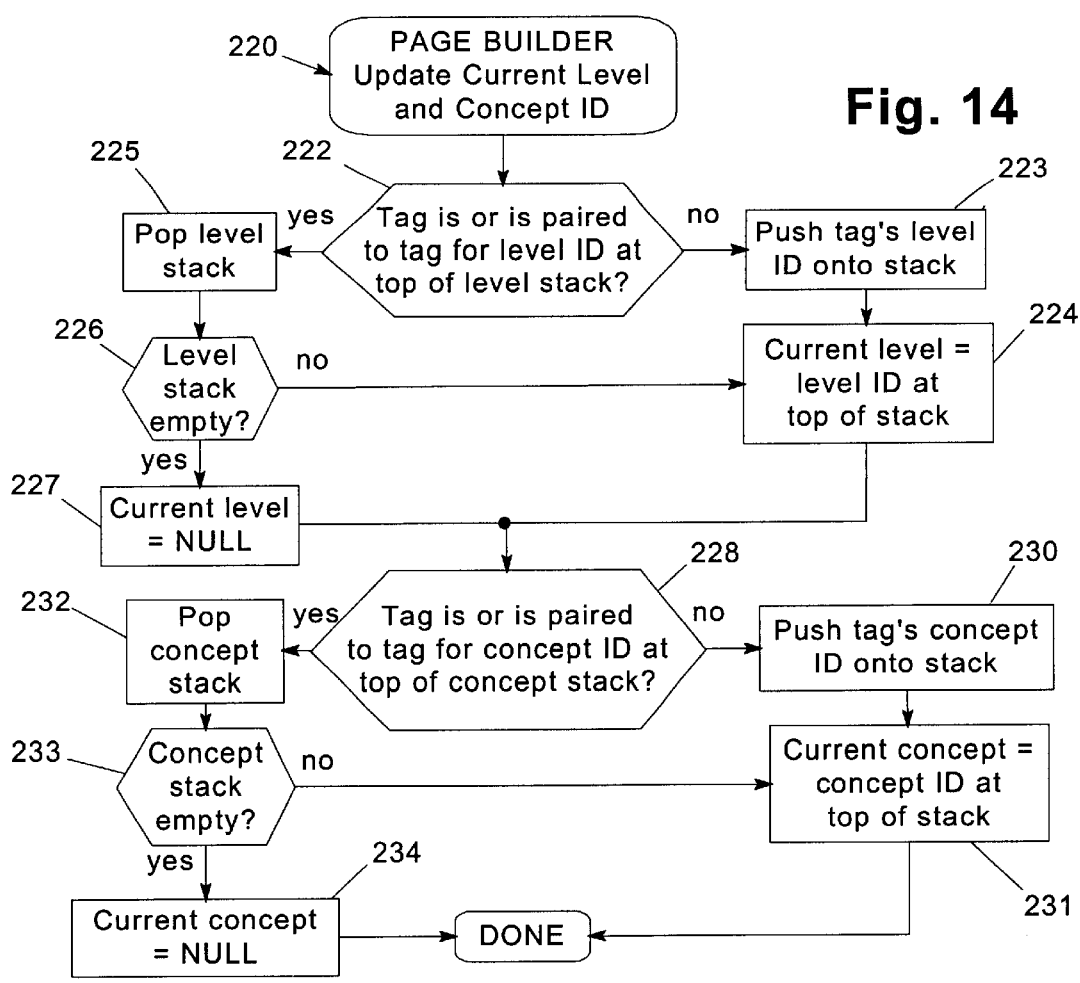
FIG. 14 is a flowchart illustrating the program flow of the update current level and concept ID routine of FIG. 12.

Routine 220 is discussed in greater detail in FIG. 14. Routine 220 is principally used to handle nested information elements by maintaining current level and concept identifiers representing the current level and named concept associated with a given location in the body of knowledge. Current level and concept identifiers are maintained in level and concept stacks, respectively. The current level and concept identifiers are respectively stored at the tops of the level and concept stacks, and as beginning and end tags of nested information elements are located, the stack is modified to track the level and concept identifiers of such tags.

Routine 220 begins in block 222 by determining whether the INFOEL tag being processed is or is paired to the tag for the level identifier found at the top of the level stack. If not, the tag's level identifier is pushed onto the level stack at block 223, and the current level is set to the level identifier at the top of the level stack in block 224 (that which was just pushed onto the stack), representing the beginning of a new level. If, however, the tag is for the level identifier at the top of the level stack, the level stack is popped in block 225 and the level retrieved thereby is discarded. Control is next passed to block 226 to determine whether the level stack is empty. If so, the current level is set to NULL in block 227. If not, control is passed to block 224 to set the current level to that stored at the top of the level stack.

Upon completion of either of blocks 224 or 227, control is passed to block 228 to perform a similar operation to determine the current concept identifier. Specifically, block 228 determines whether the INFOEL tag being processed is or is paired to the tag for the concept identifier at the top of the concept stack. If not, the tag's concept identifier is pushed onto the concept stack at block 230, and the current concept is set to the concept identifier at the top of the concept stack in block 231 (that which was just pushed onto the stack), representing the beginning of a new concept. If, however, the tag is for the concept identifier at the top of the concept stack, the concept stack is popped in block 232 and the concept retrieved thereby is discarded. Control is next passed to block 233 to determine whether the concept stack is empty. If so, the current concept is set to NULL in block 234. If not, control is passed to block 231 to set the current concept to that stored at the top of the concept stack. Upon completion of either of blocks 231 or 234, routine 220 is complete.

Figure 15:
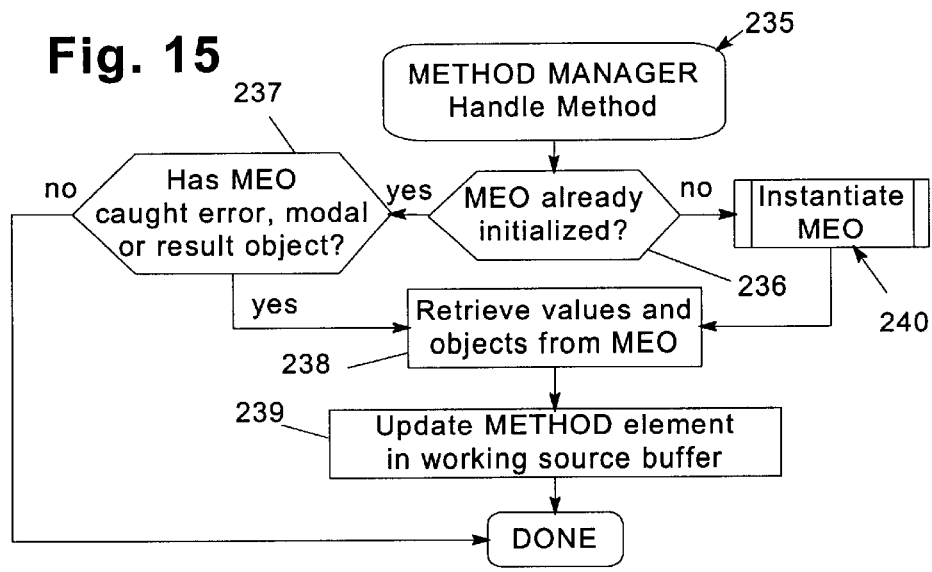
FIG. 15 is a flowchart illustrating the program flow of the handle method routine of FIG. 12.

FIG. 15 illustrates handle method routine 235 in greater detail. Routine 235 begins in block 236 by determining whether the method element object (MEO) for the METHOD element has already been initialized—that is, whether an MEO exists for the METHOD element. If the element has not been initialized, an MEO is instantiated by calling an MEO constructor routine 240 (discussed below). The level identifier, concept identifier, base object, and base object message specified in the method tag defining the element are provided as parameters to the constructor routine for the MEO.

Next, block 238 retrieves the values and objects from the MEO, typically by calling the appropriate functions provided in the interface to the MEO. Next, block 239 is called to replace the METHOD element copied into the working source buffer with a modified markup source that is different from that stored in the master body of knowledge. Typically, this is performed by generating markup source based upon the MEO values and objects retrieved above and any other elements within the METHOD element. (discussed in greater detail below). Upon completion of block 239, routine 235 is complete.

Returning to block 236, if the MEO is already initialized, block 237 is executed to determine whether the MEO has caught an error, modal or result object passed by the base object associated therewith. As discussed above, a base object may return an error message which is to be inserted between a pair of error tags located in the source. Similarly, a result may be supplied and inserted between result tags, or additional input may be requested at a location specified by modal tags. In response to any of these messages, the display of the conditioned element may be varied. As a result, if any such object is caught in block 237, blocks 238 and 239 are executed to refresh the conditioned element based upon the new values and objects received from the MEO. Routine 235 is then complete.

Figure 16:
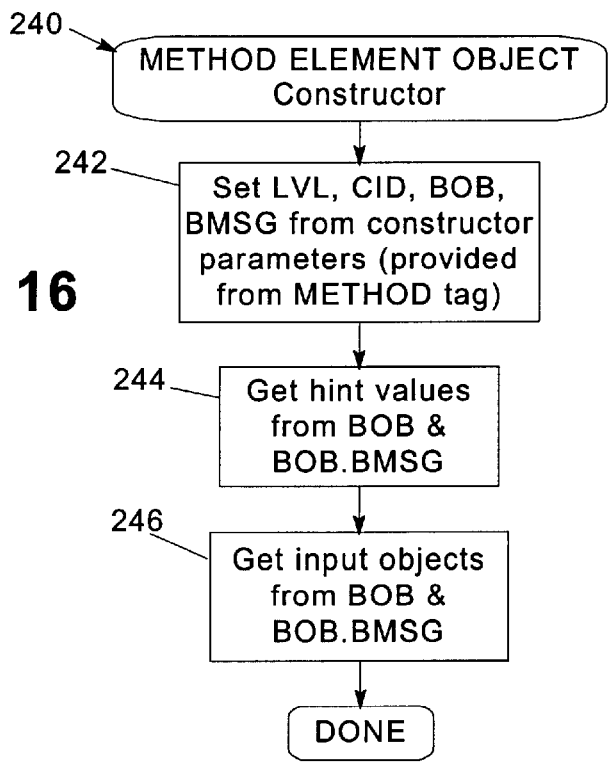
FIG. 16 is a flowchart illustrating the program flow of a method element object constructor routine called by the routine of FIG. 15.

FIG. 16 illustrates the MEO constructor routine 240 in greater detail. Routine 240 is provided with parameters corresponding to the level identifier, concept identifier, base object, and base object message specified in the method tag defining the METHOD element for which an MEO is to be instantiated. Such parameters are used to set these attributes in block 242. Next, in block 244, hint values are obtained from the base object and the base object message specified in the MEO. The hint values typically represent brief instructional material for each user interface control associated with a particular base object. Also, if no message is supplied between a pair of hint tags in the source, a hint regarding the overall function of the base object is requested. If, however, a specified base object message is placed between the hint tags, hint values representative of that base object message are requested by the MEO. Next, similar to the hint values, input objects are received from the base object and base object messages in block 246. As a result of these calls, references to each of the user interface controls associated with the MEO are returned. Routine 240 is then complete.

Figure 17:
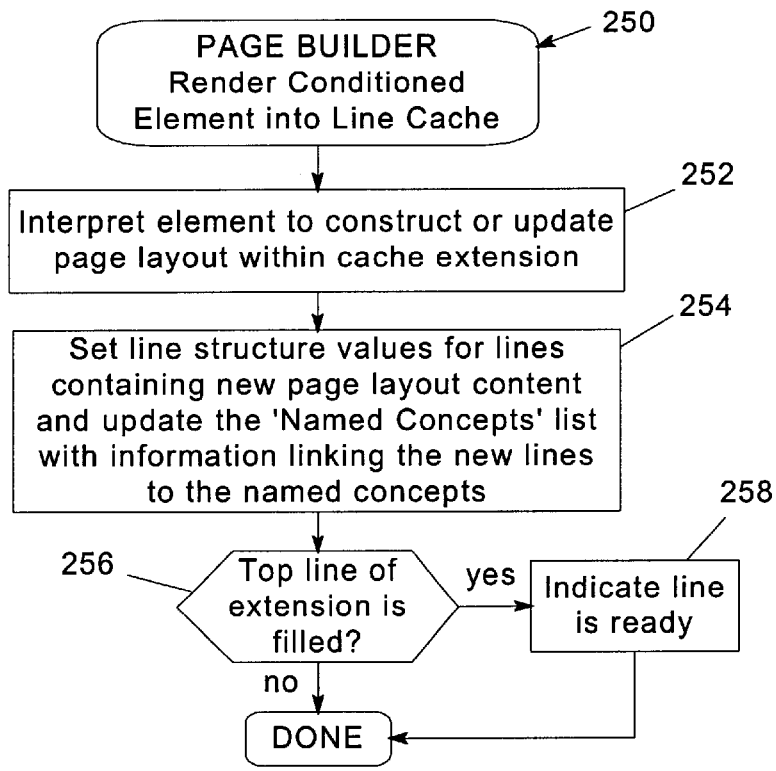
FIG. 17 is a flowchart illustrating the program flow of the render conditioned element into line cache routine of FIG. 11.

FIG. 17 illustrates render conditioned element into line cache routine 250 in greater detail. Routine 250 begins in block 252 by interpreting the conditioned element to construct or update a page layout within the line cache extension, a process that varies depending upon the type of information being rendered. It should be appreciated that the implementation of this block would be well within the ability of one of ordinary skill in the art, and moreover, that much of such implementation would operate in a manner similar to that for conventional HTML rendering provided by a page builder for a conventional browser. In addition, it is also during this operation that base object methods are called in much the same manner as an applet in conventional HTML, using a unique tag such as "<mdisplay>". Next, in block 254, the line structure values are set for each line affected by the rendered element—specifically the array of cells, the beginning and ending cell indexes, the minimum and maximum cell offsets and concept identifier for each conditioned element. It should be appreciated, for example, that an image, among other information, may span several lines, and thus, multiple line structures may need to be updated to reflect the rendering of any particular conditioned element.

Next, in block 256, it is determined whether the top line of the extension is filled. If so, control is diverted to block 258 to indicate that the line is ready, prior to terminating routine 250. If not, routine 250 is simply terminated without such an indication.

As an example of the manner in which METHOD elements are handled in the illustrated abstraction stack, the information element represented at line 26 of the body of knowledge shown in Table I is reproduced below:

<p>The user's startupfolder <hint>BOB.startupFolder</hint><input>BOB.startupFolder</input>contains links to the programs the system calls when the user signs on the system. </p>

When the body of knowledge is scanned as a part of the lens fill operation, an MEO is created for the METHOD element of lines 19–31, and the copy of the METHOD element stored in the working source buffer is updated in block 239 of routine 235 (FIG. 15), such that, in part, line 26 is reformatted as:

<p>The user's startup folder <infoel lvl=hint cid=usprf, create>Startup Folder: </infoel><infoel lvl=input cid= usrpf, create><mdisplay>userProfile.startupFolder.input</mdisplay><infoel>contains links to the programs the system calls when the user signs on the system. </p>

As seen in this text, separate nested information elements are defined for the "hint" and "input" tags in the method objects as related to the startup folder information element. Whereas formerly a pair of hint tags were supplied with an identifier for the startupFolder object supplied therebetween, the hint value returned from the base object, "Startup Folder:", is supplied between the information element tags defined for that nested information element. Consequently, when the information element is later rendered in a lens filtered to pass the hint level of abstraction, this text is displayed adjacent the user interface control corresponding to this object.

It should also be appreciated that, whereas formerly a pair of input tags were supplied with an indication message to the base object "BOB.startupFolder", such tags have been replaced with an information element tag defining the input level and including within the information element a display tag for the base object previously defined by the input tags, "<<mdisplay>userProfile.startupFolder. input</mdisplay>". The "<mdisplay>" and "</mdisplay>" tags are unique to this implementation, and are utilized in much the same manner as "<applet>" tag from conventional HTML to execute the method call defined between the tags. Thus, whenever the information element is rendered (e.g., in block 252 of routine 250 of FIG. 17), the appropriate display method for the user interface control within which the startupFolder information is supplied by a user is called to display the element on the computer display at the appropriate location.

As is also described above in connection with handle method routine 235, if the abstraction stack receives an error, modal or result message from a base object, the information element corresponding thereto must be updated to reflect the information received from the object. For example, the body of knowledge represented in Table I includes an information element defined at line 28 that consists of a pair of error tags, shown below:

<error></error>

When the copy of the METHOD element stored in the working source buffer is updated in block 239 of routine 235 (FIG. 15), an information element tag is created as specified below:

<infoel lvl=error cid=usrprf, create></infoel>

Between the opening and closing tags of the information element, no information is supplied as yet, since no error object has yet been received from the base object. However, should an error be thrown by the base object (e.g., as a result of invalid input), this is detected in block 237 of FIG. 15, whereby the METHOD element is updated via blocks 238 and 239 to reflect the updated information thrown from the base object. Receipt of an error may be handled in a number of manners, e.g., as illustrated below:

<infoel       lvl=error       cid=usrprf, create><mdisplay>userProfile.create.error</mdisplay></infoel>

As seen above, "<mdisplay>" tags including a method call to the "error" object returned by the base object may be inserted between information element tags for the error, such that, when the information element is again displayed, the method call for displaying that error is executed.

The error display method may, for example, open a dialog box that alerts the user to the error. In the alternative, instead of returning a method call, a block of text may be returned whereby an error message would simply be displayed as text within the body of knowledge. As another alternative, generation of an error may result in a supplemental abstraction stack being opened and tied to the particular input object from which the error was generated. Such an abstraction stack error object may be connected via one or more binder bands to the input object, with one or more lenses in the abstraction stack open to display an error message appropriate to user's preferred interface level. Other minor lenses within the abstraction stack may represent other error and help scheme abstraction levels available to the user. As a result, if a user clicks on one of the other lenses, the user would be able to open some form of information with one of the concept identifiers associated with the error message in the open lens. As a result, multiple levels of detail or points of view may be provided in a single help abstraction stack object so the various levels of assistance may be provided to a user in a context-specific manner. Other manners of representing an error to a user may be used in the alternative.

Figure 18:
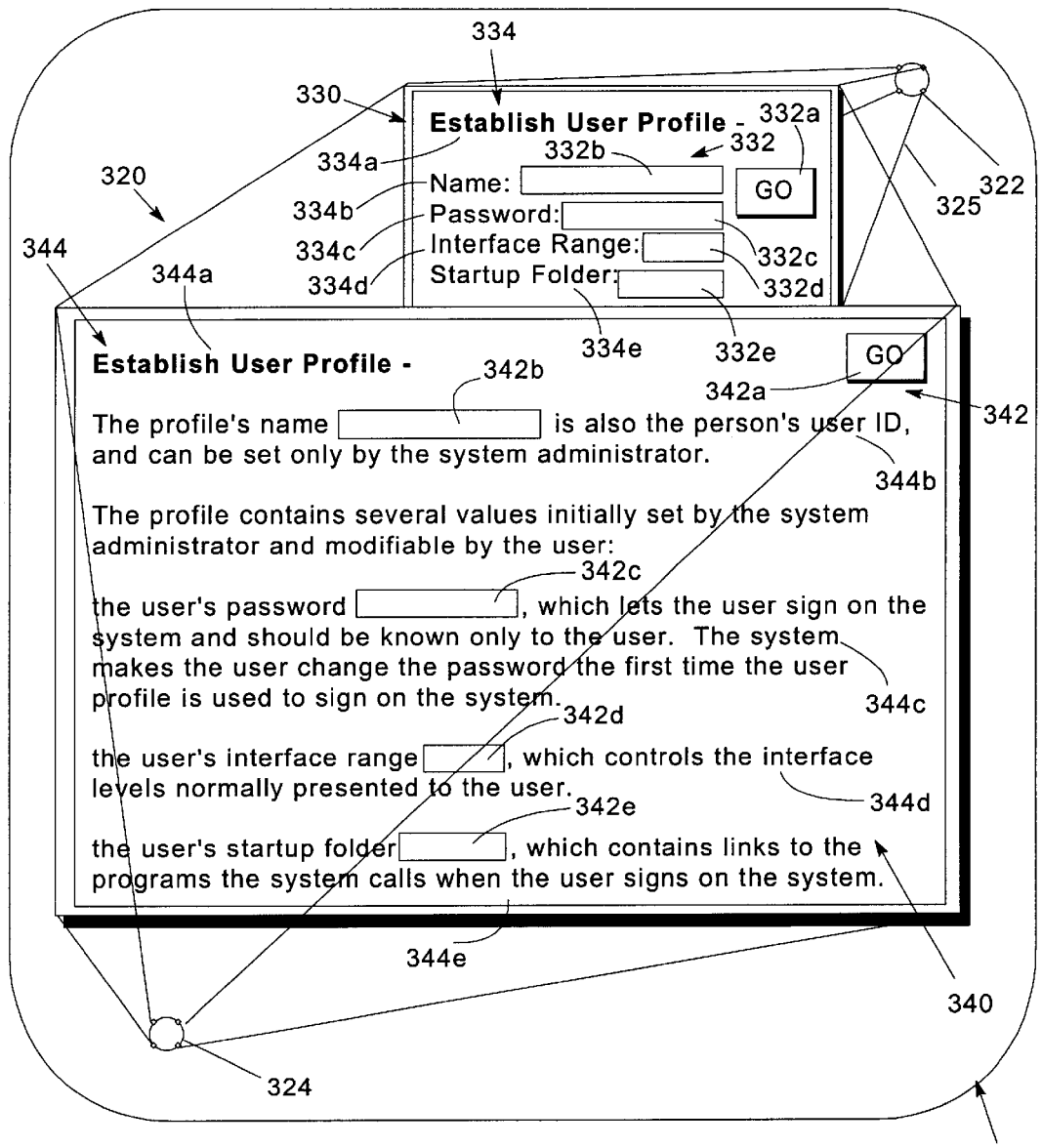
FIG. 18 is a block diagram of a computer display illustrating another representation of the abstraction stack of FIG. 5.

One principle advantage of the above-described abstraction stack implementation is that user interface controls through which a user interfaces with a base object may be integrated with multiple sets of user instructional material to provide different levels of detail, points of view or other distinctions for concurrent or selective presentation of the user interface controls to a user. For example, FIG. 18 illustrates an abstraction stack 320 representing an alternate representation to abstraction stack 300 for the same body of knowledge described above. In abstraction stack 320, a pair of lenses, 330, 340 are joined via binder bands 325 to compass handles 322, 324. Lenses 330, 340 respectively provide brief and detailed sets of instructional material regarding the various user interface controls for an establish user profile base object.

Specifically, lens 330 has a filter configuration that passes the various method levels of abstraction, including the hint level, the input level, the error level, the modal level and the result level.

As to the input level, a first representation of a set of user interface controls is designated 332, including user interface control 332a, representing a button object that invokes the establish user profile object, as well as several edit box controls 332b, 332c, 332d and 332e through which input to the object is provided. The information in the hint level supplies a first set of user instructional materials 334, with information element 334a providing a brief description of the overall object, and with information elements 334b, 334c, 334d and 334e providing brief descriptions of each of the input objects 332b–332e for the object.

Lens 340, in contrast, displays the identical portion of the body of knowledge using a different filter configuration. With the alternate filter configuration, the hint level of abstraction is now filtered out of the lens, with the article level of abstraction substituted therefor. As a result, instead of displaying the first set of user instructional material representing brief descriptions of each of the input controls and of the overall object, the more detailed descriptive text in the article level of abstraction is integrated with the user interface controls to provide more detailed information for a user when utilizing the base object. Specifically, a second representation of the user interface controls in the establish user profile object is provided at 342, including button 342a and edit boxes 342b, 342c, 342d and 342e.

It should be appreciated that each of these controls may be separate representations or manifestations of the same objects as those represented in representation 332 of lens 330. In the alternative, these controls may be based upon a separate object, which would require messages to be passed between the separate objects for each of the lenses so that any update to one of the objects is reflected in the other object as well (e.g., so that a user may input information into either representation of user interface control and have the information to the other representation concurrently updated with the same information).

The more detailed instructional material in the article level forms a second set of user instructional material 344, including information elements 344a, 344b, 344c, 344d and 344e which are presented as an alternative to the first set of user instructional materials 334 displayed in lens 330.

With the above-described abstraction stack representation, it should be appreciated that a user may interface with either lens 330 or 340, with the information input into the user interface control of either lens. In response, the other lens which did not receive input is updated concurrently to display the input information so that each lens tracks the other. The user may then invoke the object by pressing either button 332*a* or 342*a* to invoke the method.

As a result of the above-described configuration, users of different levels of experience or expertise may selectively control the presentation of the abstraction stack to suit their particular experience. Beginning users may wish to display 340 by itself, or both of lenses 330 and 340, so that detailed information about the method is provided to the user as the user is attempting to perform a task therewith. As the user gains more expertise, however, the amount of information presented by the more detailed instructions may no longer be needed by the user, whereby the user may migrate to display only lens 330 when performing operations with the stack. As a result, a wide variety of levels of expertise and experience are supported by a single abstraction stack.

Alternate Implementation

Figure 19:
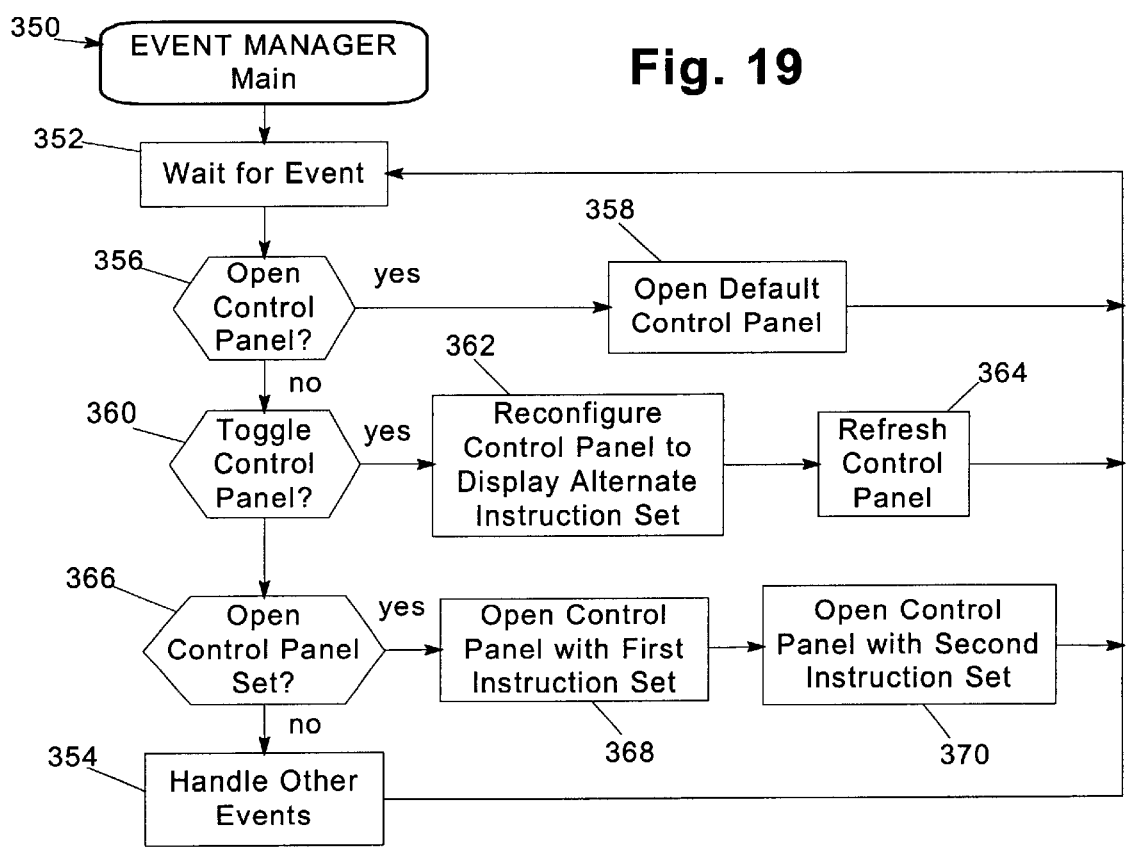
FIG. 19 is a flowchart illustrating the program flow of another main routine consistent with the invention.

While the invention has been discussed previously in the context of an abstraction stack representation of a body of knowledge, it should be appreciated that multiple sets of instructional material may be integrated with a user interface control in other manners which do not specifically utilize an abstraction stack or body of knowledge. For example, in a graphical user interface (GUI) environment such as Windows, it may be desirable to provide for the concurrent and/or selective presentation of multiple sets of user instructional material for any control supported by the environment. FIG. 19 illustrates, for example, an alternate event manager main routine 350 that waits for events at block 352, and handles such events detected at any of blocks 356, 360 or 366. Other events, which are not relevant to an understanding of the invention, may be handled in a conventional manner in block 354. One event that may be detected by routine 350 is an open control panel event detected at block 356. In response to this event, a default control panel may be opened in block 358 in a conventional manner.

Figure 20:
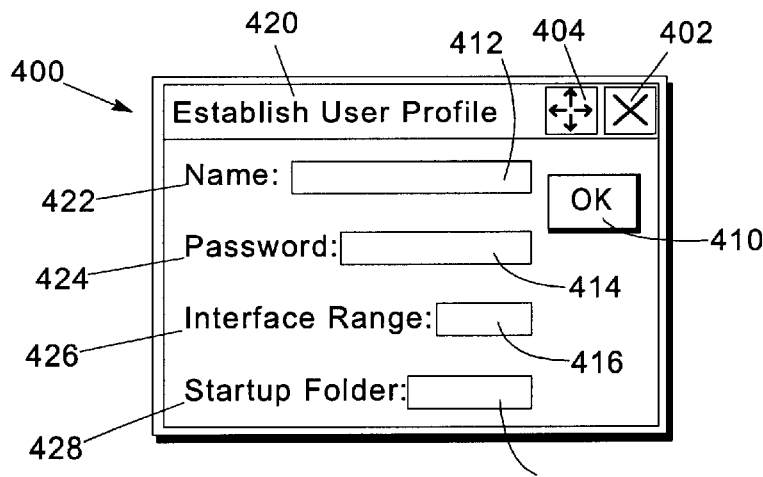
FIGS. 20 and 21 are block diagrams of alternate representations of a control panel consistent with the invention.

The control panel may include one or more user interface controls. Moreover, the default configuration thereof (which is selectable by a user) specifies one of a plurality of sets of user instructional material. For example, as shown in FIG. 20, block 358 may open a control panel 400 for the establish user profile object described above. The control panel may include a plurality of user interface controls 410, 412, 414, 416, and 418. Moreover, a first set of user instructional material, including title 420 and text objects 422, 424, 426 and 428 may be presented and integrated with the various user interface controls. Control panel 400 also includes a set of title buttons 402, 404. Title button 402 is a close button that operates in a conventional manner. Button 404, however, is a "Expand/Condense" button that permits a user to toggle between expanded and condensed instructional material for the control panel through a single button depression operation. User instructional material 420 represents a condensed set of instructional material, and thus, button 404 displays a set of arrows extending outward to indicate to the user that it is possible to expand the user instructional material for more detailed instructions on operating the control panel.

Returning to FIG. 19, another event that may be handled by routine 350 is that of a toggle control panel event, detected at block 360. In response to this event, block 362 is called to reconfigure the control panel to display an alternate instruction set. This may be performed, for example, by toggling a flag for the control panel, or in other manners known in the art. Next, the control panel is refreshed in block 364 to display the alternate representation. The toggle control panel event may be initiated, for example, by depressing button 404 on control panel 400. In addition, other user input operations, e.g., a specific keystroke combination, or changing a default setting for all control panels (e.g., through a "Preferences" or "Options" dialog box), may also be used to initiate the event.

Figure 21:
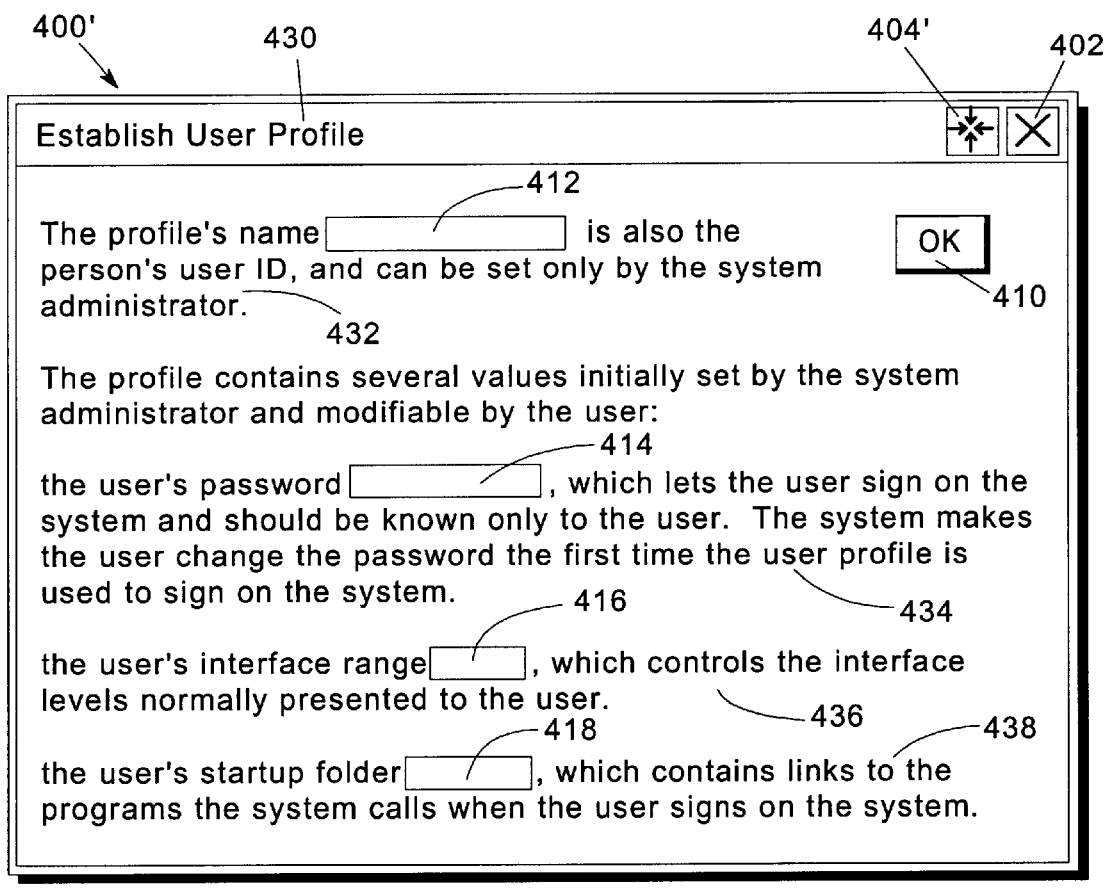

FIG. 21 illustrates, for example, the result of a toggle event as a result of depression of push button 404 on control panel 400 of FIG. 20. In the alternate representation, designated 400', the same user interface controls 410, 412, 414, 416 and 418 are displayed in the control panel. However, the brief instructional material 420 of FIG. 20 is now replaced by more detailed instructional material, represented by title text 430 and text objects 432, 434, 436 and 438. In addition, the representation of button 404 has been replaced with an alternate representation 404' which includes a plurality of arrows pointing towards one another to represent that the user may condense the expanded instructional material to the representation of control panel 400 by depressing this button.

Returning again to FIG. 19, routine 350 also may detect an open control panel set event in block 366, which indicates the user's desire to open multiple representations of control panel at the same time. If this event is detected, control is passed to block 368 to open a control panel with the first instruction set. Next, the control panel is opened with a second instruction set in block 370. This would result, for example, in both control panels 400 and 400' being displayed concurrently in response to this event.

Practically any control panel representation may be modified as described herein to permit the presentation of multiple sets of user instructional material. For example, to implement multiple representations in a standard GUI environment, a generic user interface control need only be associated with a specific flag that may be unique to each control, or may be shared among several controls that are displayed together within the same panel. Then, for each object associated therewith that provides instructional material for operating a given a user interface control, a display method thereof may be preceded by a test on the current status of the flag for the user interface control such that the display will output one of several alternate types of instructional information for the control. Other implementations will be apparent to one of ordinary skill in the art.

Various additional modifications may be made to the embodiments described herein without departing from the spirit and scope of the invention. Therefore, the invention lies solely in the claims hereinafter appended.

What is claimed is:

1. A computer system, comprising:
    (a) a computer display;
    (b) a memory configured to store a user interface control and first and second sets of user instructional material for operating the user interface control; and
    (c) a processor, coupled to the computer display and memory, the processor configured to concurrently display first and second display groups, the first display group including a displayed representation of the first set of user instructional material integrated with a first displayed representation of the user interface control, and the second display group including a displayed representation of the second set of user instructional material integrated with a second displayed representation of the user interface control, the processor further configured to actuate the user interface control in response to user input supplied to either of the first and second displayed representations thereof;

wherein the user interface control is configured to generate at least one input parameter in response to user input thereto, the input parameter utilized by a computer program during execution of such computer program, and wherein the processor is further configured to update the first displayed representation to display user input received via the second displayed representation.

2. The computer system of claim 1, wherein the memory is further configured to store at least a portion of a body of knowledge that includes a plurality of information elements, wherein each of the first and second sets of user instructional material is stored in at least one of the plurality of information elements, the body of knowledge stratified into a plurality of levels of abstraction including at least first and second levels of abstraction respectively associated with the first and second sets of user instructional material.

3. The computer system of claim 1, wherein the second set of user instructional material includes more detailed information for understanding the user interface control than the first set of user instructional material.

4. The computer system of claim 1, wherein the user interface control includes at least one graphical user interface (GUI) control selected from the group consisting of a pop-up button, a push button, a radio button, a check box, a color wheel, a combo box, a counter, a date control, an edit box, a filename box, a list box, a scroll bar, a viewer, and combinations thereof.

5. The computer system of claim 1, wherein the user interface control includes an executable computer program configured to be executed in response to user input supplied to either of the first and second displayed representations of the user interface control.

6. The computer system of claim 1, wherein the user interface control includes a command to execute a predetermined computer program, the command configured to be executed in response to user input supplied to either of the first and second displayed representations of the user interface control.

7. The computer system of claim 1, wherein the first and second displayed representations of the user interface control are different from one another.

8. The computer system of claim 1, wherein the memory is further configured to store a plurality of user interface controls including first and second user interface controls, the first user interface control configured to execute a predetermined computer program in response to user input thereto, and the second user interface control configured to generate an input parameter in response to user input thereto, the input parameter utilized by the predetermined computer program when executed in response to user input to the first user interface control.

9. A computer system, comprising:
(a) a computer display;
(b) a memory configured to store a user interface control and first and second sets of user instructional material for operating the user interface control; and
(c) a processor, coupled to the computer display and memory the processor configured to concurrently display first and second display groups, the first display group including a displayed representation of the first set of user instructional material integrated with a first displayed representation of the user interface control, and the second display group including a displayed representation of the second set of user instructional material integrated with a second displayed representation of the user interface control, the processor further configured to actuate the user interface control in response to user input supplied to either of the first and second displayed representations thereof;

wherein the memory is further configured to store at least a portion of a body of knowledge that includes a plurality of information elements, wherein each of the first and second sets of user instructional material is stored in at least one of the plurality of information elements, the body of knowledge stratified into a plurality of levels of abstraction including at least first and second levels of abstraction respectively associated with the first and second sets of user instructional material: and wherein the processor is further configured to respectively display the first and second display groups in first and second lenses, the first and second lenses generally arranged along an axis in a three dimensional workspace to represent a hierarchical relationship between the first and second display groups.

10. The computer system of claim 9, wherein each lens has associated therewith a filter criteria each filter criteria passing information elements associated with at least one predetermined level of abstraction.

11. The computer system of claim 10, wherein the filter criteria for the first lens passes information elements associated with the first level of abstraction and blocks information elements associated with the second level of abstraction, and wherein the filter criteria for the second lens passes information elements associated with the second level of abstraction and blocks information elements associated with the first level of abstraction.

12. The computer system of claim 11, wherein the plurality of levels includes a third level of abstraction associated with the user interface control, wherein the user interface control is stored in at least one of the plurality of information elements, and wherein the filter criteria for each of the first and second lenses passes information elements associated with the third level of abstraction.

13. The computer system of claim 10, wherein the user interface control is associated with the first level of abstraction and is stored in at least one of the plurality of information elements, wherein the filter criteria for the first lens passes information elements associated with the first level of abstraction and blocks information elements associated with the second level of abstraction, and wherein the filter criteria for the second lens passes information elements associated with either of the first and second levels of abstraction.

14. A computer system, comprising:
(a) a computer display:
(b) a memory configured to store a user interface control and first and second sets of user instructional material for operating the user interface control, and
(c) a processor, coupled to the computer display and memory the processor configured to concurrently display first and second display groups, the first display group including a displayed representation of the first set of user instructional material integrated with a first displayed representation of the user interface control, and the second display group including a displayed representation of the second set of user instructional material integrated with a second displayed representation of the user interface control, the processor further configured to actuate the user interface control in response to user input supplied to either of the first and second displayed representations thereof;

wherein the memory is further configured to store a plurality of user interface controls including first and second user interface controls, the first user interface control configured to execute a predetermined computer program in response to user input thereto, and the second user interface control configured to generate an input parameter in response to user input thereto, the input parameter utilized by the predetermined computer program when executed in response to user input to the first user interface control, wherein the first and second sets of user instructional material include instructional material for operating each of the plurality of user interface controls, and wherein the first and second display groups include displayed representations of the instructional material for operating each user interface control interleaved with the displayed representations of the plurality of user interface controls.

15. A method of controlling a computer system with a user interface control displayed on a computer display thereof, the method comprising:

(a) concurrently displaying first and second display groups on the computer display, the first display group including a first displayed representation of the user interface control integrated with a displayed representation of a first set of user instructional material for operating the user interface control, and the second display group including a second displayed representation of the user interface control integrated with a displayed representation of a second set of user instructional material for operating the user interface control, wherein the user interface control is configured to generate at least one input parameter in response to user input thereto, the input parameter utilized by a computer program during execution of such computer program;

(b) actuating the user interface control in response to user input supplied to either of the first and second displayed representations thereof; and (c) updating the first displayed representation to display user input received via the second displayed representation.

16. The method of claim 15, wherein each of the first and second sets of user instructional material is maintained in at least one of a plurality of information elements forming a body of knowledge, the body of knowledge stratified into a plurality of levels of abstraction including at least first and second levels of abstraction respectively associated with the first and second sets of user instructional material.

17. The method of claim 15, wherein the second set of user instructional material includes more detailed information for understanding the user interface control than the first set of user instructional material.

18. The method of claim 15, wherein the user interface control includes at least one graphical user interface (GUI) control selected from the group consisting of a pop-up button, a push button, a radio button, a check box, a color wheel, a combo box, a counter, a date control, an edit box, a filename box, a list box, a scroll bar, a viewer, and combinations thereof.

19. The method of claim 15, wherein the user interface control includes an executable computer program configured to be executed in response to user input supplied to either of the first and second displayed representations of the user interface control.

20. The method of claim 15, wherein the user interface control includes a command to execute a predetermined computer program, the command configured to be executed in response to user input supplied to either of the first and second displayed representations of the user interface control.

21. The method of claim 15, wherein the first and second displayed representations of the user interface control are different from one another.

22. The method of claim 15, further comprising displaying in each display group a display representation of a second user interface control, wherein the second user interface control is configured to execute the computer program in response to user input thereto, and wherein the input parameter is utilized by the computer program when executed in response to user input to the second user interface control.

23. The method of claim 22, wherein the first and second sets of user instructional material include instructional material for operating each of the plurality of user interface controls, and wherein the first and second display groups include displayed representations of the instructional material for operating each user interface control interleaved with the displayed representations of the plurality of user interface controls.

24. A method of controlling a computer system with a user interface control displayed on a computer display thereof the method comprising:

(a) concurrently displaying first and second display groups on the computer display the first display group including a first displayed representation of the user interface control integrated with a displayed representation of a first set of user instructional material for operating the user interface control, and the second display group including a second displayed representation of the user interface control integrated with a displayed representation of a second set of user instructional material for operating the user interface control; and (b) actuating the user interface control in response to user input supplied to either of the first and second displayed representations thereof;

wherein each of the first and second sets of user instructional material is maintained in at least one of a plurality of information elements forming a body of knowledge, the body of knowledge stratified into a plurality of levels of abstraction including at least first and second levels of abstraction respectively associated with the first and second sets of user instructional material, the method further comprising respectively displaying the first and second display groups in first and second lenses, the first and second lenses generally arranged along an axis in a three dimensional workspace to represent a hierarchical relationship between the first and second display groups, and wherein each lens has associated therewith a filter criteria passing information elements associated with at least one predetermined level of abstraction.

25. The method of claim 24, wherein the filter criteria for the first lens passes information elements associated with the first level of abstraction and blocks information elements associated with the second level of abstraction, and wherein the filter criteria for the second lens passes information elements associated with the second level of abstraction and blocks information elements associated with the first level of abstraction.

26. The method of claim 25, wherein the plurality of levels includes a third level of abstraction associated with the user interface control, wherein the user interface control is stored in at least one of the plurality of information elements, and wherein the filter criteria for each of the first and second lenses passes information elements associated with the third level of abstraction.

27. The method of claim 24, wherein the user interface control is associated with the first level of abstraction and is stored in at least one of the plurality of information elements, wherein the filter criteria for the first lens passes information elements associated with the first level of abstraction and blocks information elements associated with the second level of abstraction, and wherein the filter criteria for the second lens passes information elements associated with either of the first and second levels of abstraction.

28. A program product, comprising:
(a) a program configured to perform a method of controlling a computer system with a user interface control displayed on a computer display thereof, the method comprising:
  (1) concurrently displaying first and second display groups on the computer display, the first display group including a first displayed representation of the user interface control integrated with a displayed representation of a first set of user instructional material for operating the user interface control, and the second display group including a second displayed representation of the user interface control integrated with a displayed representation of a second set of user instructional material for operating the user interface control, wherein the user interface control is configured to generate at least one input parameter in response to user input thereto, the input parameter utilized by a computer program during execution of such computer program;
  (2) actuating the user interface control in response to user input supplied to either of the first and second displayed representations thereof and
  (3) updating the first displayed representation to display user input received via the second displayed representation; and
(b) a signal bearing media bearing the program.

29. The program product of claim 28, wherein the signal bearing media is transmission type media.

30. The program product of claim 28, wherein the signal bearing media is recordable media.

31. A computer system, comprising:
(a) a computer display;
(b) a memory configured to store a user interface control and first and second sets of user instructional material for operating the user interface control; and
(c) a processor, coupled to the computer display and memory, the processor configured to display a displayed representation of the first set of user instructional material integrated with a displayed representation of the user interface control, the processor further configured to selectively replace the displayed representation of the first set of user instructional material with a displayed representation of the second set of user instructional material in response to user input;
wherein the memory is further configured to store at least a portion of a body of knowledge that includes a plurality of information elements, wherein each of the first and second sets of user instructional material is stored in at least one of the plurality of information elements, the body of knowledge stratified into a plurality of levels of abstraction including at least first and second levels of abstraction respectively associated with the first and second sets of user instructional material;
and wherein the processor is further configured to display the displayed representations of the first set of user instructional material and the user interface control in a lens, the lens having associated therewith a filter criteria, the filter criteria passing information elements associated with at least one predetermined level of abstraction.

32. The computer system of claim 31, wherein the displayed representations of the first set of user instructional material and the user interface control define a first display group, and wherein the processor is further configured to:
(a) concurrently display a second display group with the first display group, the second display group including a displayed representation of the second set of user instructional material integrated with a second displayed representation of the user interface control; and
(b) actuate the user interface control in response to user input supplied to either of the first and second displayed representations thereof.

33. The computer system of claim 31, wherein the filter criteria for the lens passes information elements associated with the first level of abstraction and blocks information elements associated with the second level of abstraction, and wherein the processor is configured to selectively replace the displayed representation of the first set of user instructional material with the displayed representation of the second set of user instructional material by modifying the filter criteria for the lens to block information elements associated with the first level of abstraction and pass information elements associated with the second level of abstraction.

34. The computer system of claim 33, wherein the plurality of levels includes a third level of abstraction associated with the user interface control, wherein the user interface control is stored in at least one of the plurality of information elements, and wherein the filter criteria for the lens passes information elements associated with the third level of abstraction.

35. The computer system of claim 31, wherein the second set of user instructional material includes more detailed information for understanding the user interface control than the first set of user instructional material.

36. A method of controlling a computer system with a user interface control displayed on a computer display thereof, the method comprising:
(a) displaying a displayed representation of the user interface control integrated with a displayed representation of a first set of user instructional material for operating the user interface control; and
(b) in response to user input, selectively replacing the displayed representation of the first set of user instructional material with a displayed representation of a second set of user instructional material for operating the user interface control;
wherein each of the first and second sets of user instructional material is maintained in at least one of a plurality of information elements forming a body of knowledge, the body of knowledge stratified into a plurality of levels of abstraction including at least first and second levels of abstraction respectively associated with the first and second sets of user instructional material, the method further comprising displaying the displayed representations of the first set of user instructional material and the user interface control in a lens, the lens having associated therewith a filter criteria, the filter criteria passing information elements associated with at least one predetermined level of abstraction.

37. The method of claim 36, wherein the displayed representations of the first set of user instructional material and the user interface control define a first display group, the method further comprising:
(a) concurrently displaying a second display group with the first display group, the second display group including a displayed representation of the second set of user instructional material integrated with a second displayed representation of the user interface control; and (b) actuating the user interface control in response to user input supplied to either of the first and second displayed representations thereof.

38. The method of claim 36, wherein the filter criteria for the lens passes information elements associated with the first level of abstraction and blocks information elements associated with the second level of abstraction, and wherein selectively replacing the displayed representation of the first set of user instructional material with the displayed representation of the second set of user instructional material includes modifying the filter criteria for the lens to block information elements associated with the first level of abstraction and pass information elements associated with the second level of abstraction.

39. The method of claim 38, wherein the plurality of levels includes a third level of abstraction associated with the user interface control, wherein the user interface control is stored in at least one of the plurality of information elements, and wherein the filter criteria for the lens passes information elements associated with the third level of abstraction.

40. The method of claim 36, wherein the second set of user instructional material includes more detailed information for understanding the user interface control than the first set of user instructional material.

41. A program product, comprising:
  (a) a program configured to perform a method of controlling a computer system with a user interface control displayed on a computer display thereof, the method comprising:
    (1) displaying a displayed representation of the user interface control integrated with a displayed representation of a first set of user instructional material for operating the user interface control; and
    (2) in response to user input, selectively replacing the displayed representation of the first set of user instructional material with a displayed representation of a second set of user instructional material for operating the user interface control; and
  (b) a signal bearing media bearing the program;
    wherein each of the first and second sets of user instructional material is maintained in at least one of a plurality of information elements forming a body of knowledge, the body of knowledge stratified into a plurality of levels of abstraction including at least first and second levels of abstraction respectively associated with the first and second sets of user instructional material, the method performed by the program further comprising displaying the displayed representations of the first set of user instructional material and the user interface control in a lens, the lens having associated therewith a filter criteria, the filter criteria passing information elements associated with at least one predetermined level of abstraction.

42. The program product of claim 41, wherein the signal bearing media is transmission type media.

43. The program product of claim 41, wherein the signal bearing media is recordable media.

* * * * *